US011075702B2

(12) United States Patent
Black et al.

(10) Patent No.: US 11,075,702 B2
(45) Date of Patent: Jul. 27, 2021

(54) EMPIRICALLY MODULATED ANTENNA SYSTEMS AND RELATED METHODS

(71) Applicant: Searete LLC, Bellevue, WA (US)

(72) Inventors: Eric J. Black, Bothell, WA (US); Brian Mark Deutsch, Snoqualmie, WA (US); Alexander Remley Katko, Seattle, WA (US); Melroy Machado, Seattle, WA (US); Jay Howard McCandless, Alpine, CA (US); Yaroslav A. Urzhumov, Issaquah, WA (US)

(73) Assignee: The Invention Science Fund I LLC, Bellevue, WA (US)

( * ) Notice: Subject to any disclaimer, the term of this patent is extended or adjusted under 35 U.S.C. 154(b) by 0 days.

(21) Appl. No.: 16/854,416

(22) Filed: Apr. 21, 2020

(65) Prior Publication Data

US 2020/0274625 A1 Aug. 27, 2020

Related U.S. Application Data

(63) Continuation of application No. 16/059,572, filed on Aug. 9, 2018, now Pat. No. 10,630,398, which is a
(Continued)

(51) Int. Cl.
*H04B 1/00* (2006.01)
*H04B 17/12* (2015.01)
(Continued)

(52) U.S. Cl.
CPC ............. *H04B 17/12* (2015.01); *H01Q 13/20* (2013.01); *H01Q 15/0086* (2013.01);
(Continued)

(58) Field of Classification Search
CPC .. H04B 17/12; H04B 1/7113; H04B 17/3913; H04B 17/318; H04B 17/14;
(Continued)

(56) References Cited

U.S. PATENT DOCUMENTS 9,912,393 B2    3/2018  Thomas et al.
10,630,398 B2 * 4/2020  Black .................... H04B 17/14
(Continued)

FOREIGN PATENT DOCUMENTS

WO    WO 2015090351 A1    6/2015

OTHER PUBLICATIONS

International Search Report and Written Opinion of the International Searching Authority, International Application No. PCT/US2017/018348, dated Jun. 2, 2017, pp. 1-12.
(Continued)

*Primary Examiner* — Dhaval V Patel

(57) ABSTRACT

Empirically modulated antenna systems and related methods are disclosed herein. An empirically modulated antenna system includes an antenna and a controller programmed to control the antenna. The antenna includes a plurality of discrete scattering elements arranged in a one- or two-dimensional arrangement. A method includes modulating operational states of at least a portion of a plurality of discrete scattering elements of the antenna in a plurality of different modulation patterns. The plurality of different modulation patterns includes different permutations of the discrete scattering elements operating in different operational states. The method also includes evaluating a performance parameter of the antenna responsive to the plurality of different empirical one- or two-dimensional modulation patterns. The method further includes operating the antenna in one of the plurality of different one- or two-dimensional empirical modulation patterns selected based, at least in part, on the performance parameter.

36 Claims, 6 Drawing Sheets

Related U.S. Application Data continuation of application No. PCT/US2017/018348, filed on Feb. 17, 2017.

(60) Provisional application No. 62/297,072, filed on Feb. 18, 2016, provisional application No. 62/297,074, filed on Feb. 18, 2016.

(51) Int. Cl.

| | |
|---|---|
| *H01Q 13/20* | (2006.01) |
| *H01Q 15/00* | (2006.01) |
| *H01Q 21/06* | (2006.01) |
| *H04B 17/14* | (2015.01) |
| *H04B 17/318* | (2015.01) |
| *H04B 17/391* | (2015.01) |
| *H01Q 25/00* | (2006.01) |
| *H04B 1/7113* | (2011.01) |

(52) U.S. Cl.
CPC ........... *H01Q 21/061* (2013.01); *H01Q 25/00* (2013.01); *H04B 1/7113* (2013.01); *H04B 17/14* (2015.01); *H04B 17/318* (2015.01); *H04B 17/3913* (2015.01)

(58) Field of Classification Search
CPC .. H01Q 21/061; H01Q 15/0086; H01Q 13/20; H01Q 25/00

See application file for complete search history.

(56) References Cited

U.S. PATENT DOCUMENTS

| | | |
|---|---|---|
| 2006/0065856 A1 | 3/2006 | Diaz et al. |
| 2012/0170442 A1 | 7/2012 | Razaviyayn et al. |
| 2014/0071838 A1 | 3/2014 | Jia et al. |
| 2015/0288063 A1* | 10/2015 | Johnson ................... H01Q 3/24 342/352 |
| 2015/0318618 A1 | 11/2015 | Chen et al. |
| 2015/0362625 A1 | 12/2015 | Hyde et al. |
| 2016/0204515 A1 | 7/2016 | Smith et al. |

OTHER PUBLICATIONS

Non-Final Office Action, U.S. Appl. No. 16/059,572, dated Feb. 13, 2019, pp. 1-36.

Final Office Action, U.S. Appl. No. 16/059,572, dated Sep. 9, 2019, pp. 1-37.

* cited by examiner

EMPIRICALLY MODULATED ANTENNA SYSTEMS AND RELATED METHODS

PRIORITY APPLICATIONS

The present application constitutes a continuation of U.S. patent application Ser. No. 16/059,572, entitled EMPIRICALLY MODULATED ANTENNA SYSTEMS AND RELATED METHODS, naming Eric J. Black; Brian Mark Deutsch; Alexander Remley Katko; Melroy Machado; Jay Howard McCandless; Yaroslav A. Urzhumov as inventors, filed 20 Feb. 2017, which is currently co-pending or is an application of which a currently co-pending application is entitled to the benefit of the filing date, and which is a continuation of PCT Patent Application No. PCT/US2017/018348, entitled EMPIRICALLY MODULATED ANTENNA SYSTEMS AND RELATED METHODS, naming :Eric J. Black; Brian Mark Deutsch; Alexander Remley Katko; Melroy Machado; Jay Howard McCandless; Yaroslav A. Urzhumov as inventors, filed 17 Feb. 2017, which claims benefit of U.S. Provisional Application No. 62/297,072, entitled EMPIRICALLY MODULATED ANTENNA SYSTEMS AND RELATED METHODS, naming Eric J. Black; Brian Mark Deutsch; Alexander Remley Katko; Melroy Machado; Jay Howard McCandless; Yaroslav A. Urzhumov as inventors, filed 18 Feb. 2016, and also claims benefit of U.S. Provisional Application No. 62/297,074, entitled EMPIRICALLY MODULATED ANTENNA SYSTEMS AND RELATED METHODS, naming Eric J. Black; Brian Mark Deutsch; Alexander Remley Katko; Melroy Machado; Jay Howard McCandless; Yaroslav A. Urzhumov as inventors, filed 18 Feb. 2016.

All subject matter of the Priority Application(s) and of any and all applications related to the Priority Applications by priority claims (directly or indirectly), including any priority claims made and subject matter incorporated by reference therein as of the filing date of the instant application, is incorporated herein by reference to the extent such subject matter is not inconsistent herewith.

BRIEF DESCRIPTION OF THE FIGURES

FIG. 1A is a simplified view of the empirically modulated antenna system.

FIG. 1B is a simplified block diagram of the empirically modulated antenna system.

DETAILED DESCRIPTION

Figure 1A:
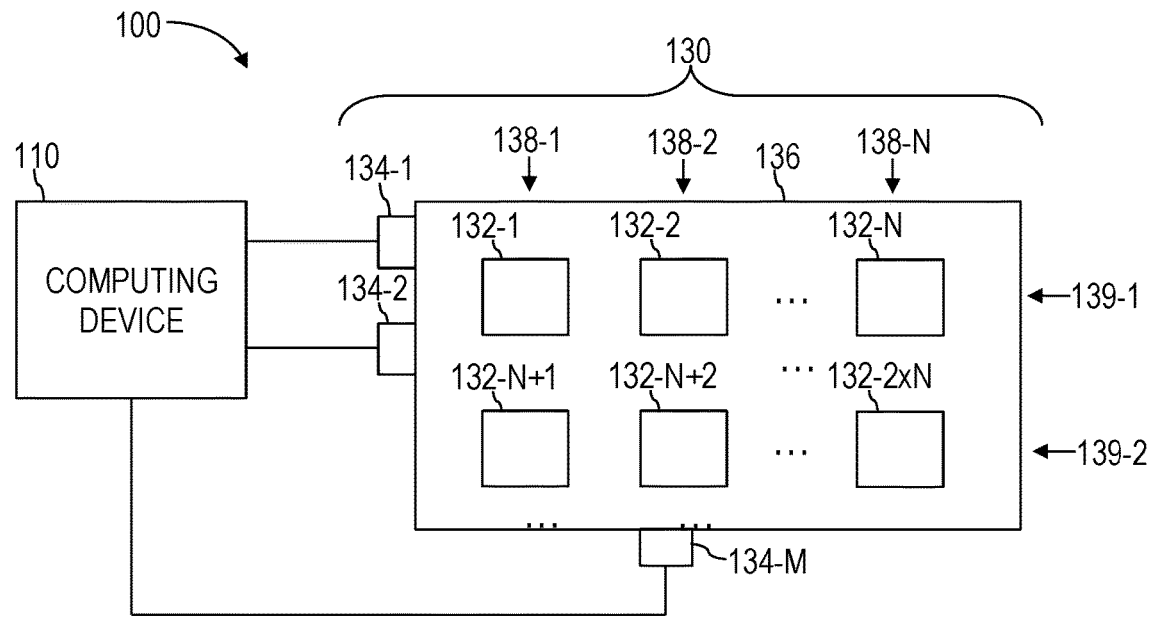
FIGS. 1A and 1B illustrate an empirically modulated antenna system.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein.

Disclosed in some embodiments herein is an empirically modulated antenna system. The empirically modulated antenna system includes an antenna including a body configured to propagate a reference wave, and a plurality of discrete scattering elements spaced at sub-wavelength dimensions of a functional wavelength of the antenna. The plurality of discrete scattering elements are arranged in a substantially one- or two-dimensional arrangement. The plurality of discrete scattering elements is supported by the body. Also, each of the discrete scattering elements of the plurality is configured to function individually in a plurality of different operational states, and collectively in a plurality of different modulation patterns. The plurality of different modulation patterns comprises different permutations of the discrete scattering elements operating in the plurality of different operational states. The empirically modulated antenna system also includes control circuitry including a controller configured to control the discrete scattering elements to function in the plurality of different operational states. The controller is programmed to: modulate the scattering elements to operate in a plurality of one- or two-dimensional modulation patterns comprising different permutations of the discrete scattering elements operating in the plurality of different operational states; monitor a performance parameter of the antenna responsive to the plurality of one- or two-dimensional modulation patterns; and set the group of discrete scattering elements to operate in one of the plurality of one- or two-dimensional modulation patterns selected based, at least in part, on the monitored performance parameter.

Disclosed in some embodiments herein is a method for empirically modulating an antenna. The method includes modulating operational states of at least a portion of a plurality of discrete scattering elements of an antenna in a plurality of different empirical one- or two-dimensional modulation patterns. The plurality of different empirical one- or two-dimensional modulation patterns includes different permutations of the discrete scattering elements operating in different operational states. The plurality of discrete scattering elements is arranged in substantially a one- or two-dimensional arrangement. The method also includes evaluating a performance parameter of the antenna responsive to the plurality of different empirical one- or two-dimensional modulation patterns. The method further includes operating the antenna in one of the plurality of different one- or two-dimensional empirical modulation patterns selected based, at least in part, on the performance parameter.

Embodiments of the disclosure include empirically modulated antenna systems and related methods for empirically tuning an antenna. Various features disclosed herein may be applied alone or in combination with others of the features disclosed herein. These features are too numerous to explicitly indicate herein each and every other one of the features that may be combined therewith. Therefore, any feature disclosed herein that is practicable, in the view of one of ordinary skill, to combine with any other one or more others of the features disclosed herein, is contemplated herein to be combined. A non-exhaustive list of some of these disclosed features that may be combined with others of the disclosed features follows.

For example, in some embodiments, disclosed is an antenna including a plurality of discrete scattering elements arranged in a plurality of rows.

In some embodiments, disclosed is an antenna including a plurality of discrete scattering elements arranged in a plurality of rows in a first direction and a plurality of rows in a second direction.

In some embodiments, disclosed is an antenna including a plurality of discrete scattering elements arranged in a plurality of rows in a first direction and a plurality of rows in a second direction, the second direction substantially perpendicular to the first direction.

In some embodiments, disclosed is a controller programmed to: initially set a plurality of discrete scattering elements to operate in an initial modulation pattern; assign an order to at least a portion of the plurality of discrete scattering elements from a first scattering element to a last scattering element; and perform, for each discrete scattering element of the portion starting with the first discrete scattering element and progressing in the assigned order through the portion, operational acts comprising: evaluating a performance parameter responsive to a current scattering element operating in a current one of a plurality of different operational states; modulating the current scattering element to operate in at least one of the others of the plurality of different operational states; evaluating the performance parameter responsive to each of the at least one of the others of the plurality of different operational states; and setting the current scattering element to operate in an operational state of the plurality of different operational states that corresponds to a best resulting performance parameter.

In some embodiments, disclosed is a controller programmed to: initially set a plurality of discrete scattering elements to operate in an initial modulation pattern; assign an order to each of the scattering elements of at least a portion of the plurality of discrete scattering elements row-by-row starting with a first row and ending with a last row; and perform, for each scattering element of the portion starting with a first scattering element and progressing in the assigned order through the portion, operational acts comprising:

evaluating a performance parameter of an antenna responsive to a current scattering element operating in a current one of a plurality of different operational states; modulating the current scattering element to operate in at least one of the others of the plurality of different operational states; evaluating the performance parameter responsive to each of the at least one of the others of the plurality of different operational states; and setting the current scattering element to operate in an operational state of the plurality of different operational states that corresponds to a best resulting performance parameter.

In some embodiments, disclosed is a controller programmed to initially operate a plurality of discrete scattering elements in an initial modulation pattern; assign an order to each scattering element of at least a portion of the plurality of discrete scattering elements starting with a first scattering element and ending with a last scattering element, regardless of which of the rows each scattering element of the portion belongs to; and perform, for each scattering element of the portion, starting with the first scattering element and progressing in the assigned order through the portion, operational acts comprising: evaluating a performance parameter of an antenna responsive to a current scattering element operating in a current one of the plurality of different operational states; modulating the current scattering element to operate in at least one of the others of the plurality of different operational states; evaluating the performance parameter responsive to each of the at least one of the others of the plurality of different operational states; and setting the current scattering element to operate in an operational state of the plurality of different operational states that corresponds to a best resulting performance parameter.

In some embodiments, disclosed is a controller programmed to: initially operate a plurality of discrete scattering elements of an antenna in an initial modulation pattern; assign an order to each scattering element of at least a portion of the plurality of discrete scattering elements; and perform operational acts for each scattering element of the portion in the assigned order, the operational acts comprising: evaluating a performance parameter of the antenna responsive to a current scattering element operating in a current one of a plurality of different operational states; modulating the current scattering element to operate in at least one of the others of the plurality of different scattering elements; evaluating the performance parameter responsive to each of the at least one of the others of the plurality of different operational states; and setting the current scattering element to operate in an operational state of the plurality of different operational states that corresponds to a best resulting performance parameter.

In some embodiments, disclosed is an antenna comprising a communication antenna configured to communicate wireless data to a far-end antenna.

In some embodiments, disclosed is an antenna comprising a power transmission antenna configured to transmit wireless power to a wirelessly powered device.

In some embodiments, disclosed is an initial modulation pattern of an antenna comprising a plurality of discrete scattering elements operating in a naïve holographic modulation pattern.

In some embodiments, disclosed is an initial modulation pattern of an antenna comprising each discrete scattering element of a plurality of discrete scattering elements operating in a same one of a plurality of different operational states.

In some embodiments, disclosed is an initial modulation pattern of an antenna comprising a plurality of discrete scattering elements operating in a previously-used modulation pattern.

In some embodiments, disclosed is an initial modulation pattern of an antenna comprising a plurality of discrete scattering elements operating in a user-selected previously-used modulation pattern.

In some embodiments, disclosed is control circuitry comprising a Global Positioning System (GPS), and a controller programmed to store previously-used modulation patterns of an antenna associated with location data from the GPS, and set a plurality of discrete scattering elements to operate in one of the previously-used modulation patterns that is associated with GPS data that matches a current location of the antenna.

In some embodiments, disclosed is a controller programmed to assign a discrete scattering element of a portion of discrete scattering elements that is located closest to one or more feed-points of an antenna to be a first scattering element in an assigned order.

In some embodiments, disclosed is a controller programmed to assign a first row of a plurality of rows of discrete scattering elements to be a row that is closest to one or more feedpoints of an antenna.

In some embodiments, disclosed is a controller programmed to assign a first through a last row of a plurality of rows of discrete scattering elements to be a closest row to one or more feedpoints of an antenna through a farthest row from the one or more feedpoints, respectively.

In some embodiments, disclosed is a controller programmed to randomly assign a plurality of rows of a plurality of discrete scattering elements to be a first row through a last row.

In some embodiments, disclosed is a controller programmed to order discrete scattering elements within each of a plurality of rows from a first discrete scattering element that is closest to one or more feedpoints of an antenna to a last discrete scattering element that is farthest from the one or more feedpoints.

In some embodiments, disclosed is a controller programmed to randomly order discrete scattering elements within each of a plurality of rows.

In some embodiments, disclosed is a controller programmed to assign an order to at least a portion of a plurality of discrete scattering elements of an antenna according to proximity of each of the scattering elements of the portion to one or more feed-points of the antenna regardless of which of the rows each scattering element of the portion belongs to.

In some embodiments, disclosed is a controller programmed to assign an order to at least a portion of a plurality of discrete scattering elements of an antenna across diagonals through the plurality of discrete scattering elements.

In some embodiments, disclosed is a controller programmed to assign an order to at least a portion of a plurality of discrete scattering elements of an antenna according to proximity of each of the scattering elements of the portion to one or more feed-points of the antenna.

In some embodiments, disclosed is a controller programmed to assign an order to at least a portion of a plurality of discrete scattering elements of an antenna at least substantially randomly.

In some embodiments, disclosed is a controller programmed to assign a scattering element of at least a portion of a plurality of discrete scattering elements of an antenna that is located closest to one or more feed-points of the antenna to be a first scattering element.

In some embodiments, disclosed is an antenna comprising a single feed-point, and a controller is programmed to assign an order to at least a portion of a plurality of discrete scattering elements of the antenna proportionally to proximity of the scattering elements of the portion to the single feed-point of the antenna.

In some embodiments, disclosed is an antenna comprising a plurality of feed-points, and a controller programmed to assign scattering elements of at least a portion of a plurality of discrete scattering elements that are located closest to one of the plurality of feed-points of the antenna to be earliest in an assigned order.

In some embodiments, disclosed is a controller programmed to assign an order to discrete scattering elements of an antenna at least substantially randomly.

In some embodiments, disclosed is a controller programmed to assign another order, in addition to an order, to each scattering element of at least a portion of a plurality of discrete scattering elements, and perform operational acts for at least a subset of the scattering elements of the portion in the other order after performing the operational acts for each of the scattering elements of the portion in the order.

In some embodiments, disclosed is a performance parameter of an antenna comprising a gain value of a transmit-receive link between the antenna and a receiving antenna.

In some embodiments, disclosed is a performance parameter of an antenna comprising a Received Signal Strength Indicator (RSSI) indicating a received signal strength of a transmitted signal transmitted by the antenna and received at a receiving antenna receiving the transmitted signal.

In some embodiments, disclosed is a transmitted signal comprising a training signal.

In some embodiments, disclosed is a training signal comprising a simple sinusoidal tone.

In some embodiments, disclosed is a training signal comprising a modulated signal that is similar to a data signal that would be transmitted from an antenna to a far-end antenna.

In some embodiments, disclosed is a training signal comprising a pseudo-random sequence.

In some embodiments, disclosed is a transmitted signal comprising a communication signal comprising communication data transmitted by an antenna to a far-end antenna.

In some embodiments, disclosed is a performance parameter of an antenna comprising a received signal strength parameter of a signal received by the antenna from a transmitting antenna.

In some embodiments, disclosed is a plurality of different operational states of a plurality of scattering elements of an antenna comprising only two operational states.

In some embodiments, disclosed is a plurality of different operational states of a plurality of scattering elements of an antenna comprises three or more operational states.

In some embodiments, disclosed is a controller programmed to modulate a current scattering element to operate in each of others of a plurality of different operational states, other than a current one of the plurality of different operational states.

In some embodiments, disclosed is a controller programmed to modulate a current scattering element to operate in less than all of others of a plurality of different operational states, other than a current one of the plurality of different operational states.

In some embodiments, disclosed is a controller programmed to repeatedly progress through scattering elements of at least a portion of a plurality of scattering elements of an antenna.

In some embodiments, disclosed is a controller programmed to stop progressing through scattering elements of at least a portion of a plurality of scattering elements of an antenna after progressing through each of the scattering elements of the portion a predetermined number of times.

In some embodiments, disclosed is a controller programmed to stop progressing through at least a portion of a plurality of discrete scattering elements of an antenna when a performance parameter of the antenna improves beyond a predetermined threshold.

In some embodiments, disclosed is a plurality of different operational states of an antenna comprising only two operational states comprising a first operational state and a second operational state.

In some embodiments, disclosed is, in addition to a plurality of discrete scattering elements arranged in a substantially one-dimensional arrangement and supported by a body of an antenna, at least one other plurality of discrete scattering elements arranged in a substantially one dimensional arrangement and supported by the body. Each other discrete scattering element of the at least one other plurality of discrete scattering elements is configured to function: individually in a plurality of different operational states, and collectively in a plurality of different modulation patterns comprising different permutations of the discrete scattering elements and the other discrete scattering elements operating in the plurality of different operational states. The controller is configured to control each of the other plurality of discrete scattering elements to function in the plurality of different operational states.

In some embodiments, disclosed is a controller programmed to initially set a plurality of discrete scattering elements and at least one other plurality of discrete scattering elements to operate in an initial modulation pattern; assign an order to scattering elements of at least a portion of the plurality of discrete scattering elements and the at least one other plurality of discrete scattering elements from a first scattering element to a last scattering element; and perform, for each scattering element of the portion, starting with the first scattering element and progressing in the assigned order through the portion, operational acts comprising: evaluating a performance parameter of the antenna responsive to a current scattering element operating in a current one of a plurality of different operational states; modulating the current scattering element to operate in at least one of the others of the plurality of different operational states; evaluating the performance parameter responsive to each of the at least one of the others of the plurality of different operational states; and setting the current scattering element to operate in an operational state of the plurality of different operational states that corresponds to a best resulting performance parameter.

In some embodiments, disclosed is a controller programmed to assign the order according to proximity of each discrete scattering element of at least a portion of a plurality of discrete scattering elements and another plurality of discrete scattering elements to one or more feed-points of an antenna regardless of which of the plurality of discrete scattering elements and the other plurality of discrete scattering elements each of the discrete scattering elements belongs to.

In some embodiments, disclosed is a controller programmed to assign each discrete scattering element of another plurality of discrete scattering elements, as opposed to a plurality of discrete scattering elements, to be earlier in an assigned order if, on average, the other plurality of discrete scattering elements is located closer to one or more feed-points of an antenna than the plurality of discrete scattering elements.

In some embodiments, disclosed is a controller programmed to assign those of another plurality of discrete scattering elements, other than a plurality of discrete scattering elements, that are located closest to one of one or more feed-points of an antenna to be earlier in an assigned order than those of the other plurality of discrete scattering elements that are located farthest from one of the one or more feed-points.

In some embodiments, disclosed is a controller programmed to assign an order to scattering elements of an antenna at least substantially randomly.

In some embodiments, disclosed is a controller programmed to evaluate a performance parameter of an antenna for each possible permutation of discrete scattering elements of the antenna operating in a plurality of different operational states, and set the plurality of discrete scattering elements to operate in a resulting empirical modulation pattern that corresponds to a best observed performance parameter.

In some embodiments, disclosed is a controller programmed to evaluate a performance parameter of an antenna for each of a subset of possible permutations of discrete scattering elements of the antenna operating in a plurality of different operational states, and set the plurality of discrete scattering elements to operate in a resulting empirical modulation pattern that corresponds to a best observed performance parameter.

In some embodiments, disclosed are scattering elements in a plurality of discrete scattering elements of an antenna that are spaced apart at less than a quarter of a free-space wavelength at an operating frequency of the antenna.

In some embodiments, disclosed are scattering elements of a plurality of discrete scattering elements of an antenna that are spaced apart at less than a fifth of a free-space wavelength at an operating frequency of the antenna.

In some embodiments, disclosed is a performance parameter of an antenna that is computed using a cost function.

In some embodiments, disclosed is a method comprising: setting a plurality of discrete scattering elements of an antenna to operate in an initial modulation pattern; assigning an order to scattering elements of at least a portion of the plurality of discrete scattering elements from a first scattering element to a last scattering element; and performing, for each of the scattering elements of the portion starting with the first scattering element and progressing in the assigned order through the portion, operational acts comprising: evaluating a performance parameter of the antenna responsive to a current scattering element operating in a current one of different operational states; modulating the current scattering element to operate in at least one other of the different operational states; evaluating the performance parameter responsive to each of the at least one other of the different operational states; and operating the current scattering element in an operational state of the different operational states that results in a best performance parameter.

In some embodiments, disclosed is a method comprising: setting a plurality of discrete scattering elements of an antenna arranged in a plurality of rows to operate in an initial modulation pattern; assigning an order to the discrete scattering elements of at least a portion of the plurality of discrete scattering elements regardless of which of the plurality of rows the discrete scattering elements belong to; and performing, for each of the scattering elements of the portion in the assigned order, operational acts comprising: evaluating the performance parameter responsive to a current scattering element operating in a current one of a plurality of different operational states; modulating the current scattering element to operate in at least one of the others of the plurality of different operational states; evaluating the performance parameter responsive to each of the at least one of the others of the plurality of different operational states; and operating the current scattering element in an operational state of the plurality of different operational states that results in a best performance parameter.

In some embodiments, disclosed is a method comprising: setting a plurality of discrete scattering elements of an antenna to operate in an initial modulation pattern; assigning an order to the discrete scattering elements of the portion; and performing, for each of the discrete scattering elements of the portion in the assigned order, operational acts comprising: evaluating a performance parameter of an antenna responsive to a current scattering element operating in a current one of different operational states; modulating the current scattering element to operate in at least one of the others of the different operational states; evaluating the performance parameter responsive to each of the at least one of the others of the different operational states; and operating the current scattering element in an operational state of the plurality of different operational states that results in a best performance parameter.

In some embodiments, disclosed is a method comprising communicating data wirelessly to a far-end antenna through an antenna.

In some embodiments, disclosed is a method comprising transmitting power wirelessly to a wirelessly-powered device through an antenna.

In some embodiments, disclosed is a method comprising setting a plurality of discrete scattering elements to operate in an initial modulation pattern, which comprises setting the plurality of discrete scattering elements to operate in a naïve holographic modulation pattern.

In some embodiments, disclosed is a method comprising setting a plurality of discrete scattering elements to operate in an initial modulation pattern, which comprises setting each of the discrete scattering elements of the plurality of discrete scattering elements to operate in a same one of different operational states of the plurality of discrete scattering elements.

In some embodiments, disclosed is a method comprising setting a plurality of discrete scattering elements to operate in an initial modulation pattern, which comprises setting the plurality of discrete scattering elements to operate in a previously-used modulation pattern.

In some embodiments, disclosed is a method comprising setting a plurality of discrete scattering elements to operate in an initial modulation pattern, which comprises setting the plurality of discrete scattering elements to operate in a user-selected previously-used modulation pattern.

In some embodiments, disclosed is a method comprising storing, in a data storage device, data corresponding to previously-used modulation patterns and associated location data from a Global Positioning System (GPS), and setting a plurality of discrete scattering elements of an antenna to operate in one of the previously-used modulation patterns that is associated with location data that matches a current location of the antenna.

In some embodiments, disclosed is a method comprising assigning an order to discrete scattering elements of at least a portion of a plurality of discrete scattering elements of an antenna, which comprises assigning a discrete scattering element of the portion that is located closest to one or more feed-points of the antenna to be the a first scattering element.

In some embodiments, disclosed is a method comprising assigning an order to discrete scattering elements of at least a portion of a plurality of discrete scattering elements of an antenna, which comprises starting with a row that is closest to one or more feedpoints of the antenna.

In some embodiments, disclosed is a method comprising assigning an order to discrete scattering elements of at least a portion of a plurality of discrete scattering elements of an antenna, which comprises assigning the order based, at least in part, on proximity of the discrete scattering elements of the portion to a single feed-point of the antenna In some embodiments, disclosed is a method comprising assigning an order to discrete scattering elements of at least a portion of a plurality of discrete scattering elements of an antenna row-by-row starting with a first row and ending with a last row, which comprises assigning the order row-by-row starting with a row that is closest to one or more feedpoints of the antenna and assigning subsequent rows through the last row based on proximity of each of the rows to the one or more feedpoints.

In some embodiments, disclosed is a method comprising assigning an order to discrete scattering elements of at least a portion of a plurality of discrete scattering elements of an antenna row-by-row starting with a first row and ending with a last row, which comprises randomly assigning the plurality of rows to be the first row through the last row.

In some embodiments, disclosed is a method comprising assigning an order to discrete scattering elements of at least a portion of a plurality of discrete scattering elements of an antenna row-by-row starting with a first row and ending with a last row, which comprises ordering the discrete scattering elements within each of the plurality of rows from a first discrete scattering element that is located closest to one or more feedpoints of the antenna to a last discrete scattering element that is farthest from the one or more feedpoints.

In some embodiments, disclosed is a method comprising assigning an order to discrete scattering elements of at least a portion of a plurality of discrete scattering elements of an antenna, which comprises assigning discrete scattering elements of the portion that are located closest to one of a plurality of feed-points of the antenna to be earliest in the assigned order.

In some embodiments, disclosed is a method comprising assigning an order to discrete scattering elements of at least a portion of a plurality of discrete scattering elements of an antenna row-by-row starting with a first row and ending with a last row, which comprises randomly ordering the discrete scattering elements within each of the plurality of rows.

In some embodiments, disclosed is a method comprising assigning an order to discrete scattering elements of at least a portion of a plurality of discrete scattering elements of an antenna, which comprises assigning the order at least substantially randomly.

In some embodiments, disclosed is a method comprising assigning an order to discrete scattering elements of at least a portion of a plurality of discrete scattering elements of an antenna, which comprises ordering the discrete scattering elements of the portion diagonally through a two-dimensional arrangement of the plurality of discrete scattering elements.

In some embodiments, disclosed is a method comprising assigning an order to discrete scattering elements of at least a portion of a plurality of discrete scattering elements of an antenna, which comprises ordering the discrete scattering elements according to their proximity to one or more feed-points of the antenna.

In some embodiments, disclosed is a method comprising assigning an order to discrete scattering elements of at least a portion of a plurality of discrete scattering elements of an antenna, which comprises at least substantially randomly ordering the discrete scattering elements of the portion.

In some embodiments, disclosed is a method comprising assigning an order to discrete scattering elements of at least a portion of a plurality of discrete scattering elements of an antenna, which comprises assigning a discrete scattering element of the portion that is located closest to one or more feed-points of the antenna to be a first scattering element.

In some embodiments, disclosed is a method comprising assigning another order, other than an order, to each of a plurality of scattering elements of at least a portion of the plurality of discrete scattering elements, and performing operational acts for at least a subset of the discrete scattering elements of the portion in the other order after performing the operational acts for each of the discrete scattering elements of the portion in the order.

In some embodiments, disclosed is a method comprising evaluating a performance parameter of an antenna, which comprises evaluating a gain value of a transmit-receive link between the antenna and a receiving antenna.

In some embodiments, disclosed is a method comprising evaluating a performance parameter comprising: transmitting a transmitted signal with an antenna to a far-end antenna, and evaluating a Received Signal Strength Indicator (RSSI) indicating a received signal strength of the transmitted signal received at the far-end antenna.

In some embodiments, disclosed is a method comprising evaluating a performance parameter, which comprises transmitting a transmitted signal with the antenna to a far-end antenna, wherein transmitting a transmitted signal comprises transmitting a training signal.

In some embodiments, disclosed is a method comprising transmitting a training signal, which comprises transmitting a simple sinusoidal tone.

In some embodiments, disclosed is a method comprising transmitting a training signal, which comprises transmitting a modulated signal that is similar to a data signal that would be transmitted from the antenna to the far-end antenna.

In some embodiments, disclosed is a method comprising transmitting a modulated signal that is similar to a data signal that would be transmitted from the antenna to the far-end antenna, which comprises transmitting a pseudo-random sequence.

In some embodiments, disclosed is a method comprising evaluating a performance parameter, which comprises transmitting a transmitted signal with the antenna to a far-end antenna, wherein transmitting a transmitted signal comprises transmitting a communication signal comprising communication data transmitted by the antenna to the far-end antenna.

In some embodiments, disclosed is a method including evaluating a performance parameter of an antenna, wherein evaluating a performance parameter comprises evaluating a received signal strength parameter of a signal received by the antenna from a far-end antenna.

In some embodiments, disclosed is a method including modulating a current scattering element to operate in at least one of others of different operational states, other than a current operational state, wherein modulating a current scattering element comprises modulating the current scattering element to operate in each of the others of the different operational states.

In some embodiments, disclosed is a method including modulating a current scattering element to operate in at least one of others of different operational states, other than a current operational state, wherein modulating a current scattering element comprises modulating the current scattering element to operate in less than all of the others of the different operational states.

In some embodiments, disclosed is a method including performing operational acts to empirically tune an antenna, wherein performing operational acts comprises performing the operational acts repeatedly by repeatedly progressing through scattering elements of at least a portion of a plurality of discrete scattering elements of the antenna.

In some embodiments, disclosed is a method comprising terminating progression through scattering elements of at least a portion of a plurality of discrete scattering elements of an antenna after progressing through each of the scattering elements of the portion a predetermined number of times.

In some embodiments, disclosed is a method comprising terminating progression through scattering elements of at least a portion of a plurality of discrete scattering elements of an antenna responsive to determining that a performance parameter of the antenna improved beyond a predetermined threshold.

In some embodiments, disclosed is a method comprising modulating operational states of at least a portion of a plurality of discrete scattering elements of an antenna, wherein modulating operational states comprises modulating between only two operational states of the portion of the plurality of discrete scattering elements.

In some embodiments, disclosed is a method comprising modulating operational states of at least a portion of scattering elements of a plurality of discrete scattering elements arranged in a one-dimensional arrangement, and further comprising modulating operational states of at least a portion of at least one other plurality of discrete scattering elements arranged in a substantially one dimensional arrangement to obtain the plurality of different empirical modulation patterns.

In some embodiments, disclosed is a method comprising: setting a plurality of discrete scattering and at least one other plurality of discrete scattering elements to operate in an initial modulation pattern; assigning an order to the discrete scattering elements of the portion from a first scattering element to a last scattering element; and performing, for each of the discrete scattering elements of the portion starting with the first scattering element and progressing in the assigned order through the portion, operational acts comprising: evaluating a performance parameter responsive to a current scattering element operating in a current one of different operational states; modulating the current scattering element to operate in at least one of the others of the different operational states;

evaluating the performance parameter responsive to each of the at least one of the others of the different operational states; and operating the current scattering element in an operational state of the different operational states that corresponds to a best resulting performance parameter.

In some embodiments, disclosed is a method including assigning an order to discrete scattering elements of at least a portion of a plurality of discrete scattering elements and at least another plurality of discrete scattering elements, wherein assigning the order comprises assigning a discrete scattering element that is located closest to one of one or more feed-points of the antenna to be the first scattering element.

In some embodiments, disclosed is a method including assigning an order to discrete scattering elements of at least a portion of a plurality of discrete scattering elements and at least another plurality of discrete scattering elements of an antenna, wherein assigning the order comprises assigning each of the discrete scattering elements of the other plurality of discrete scattering elements to be earlier in the assigned order if, on average, the other plurality of discrete scattering elements is located closer to one or more feed-points of the antenna than the plurality of discrete scattering elements.

In some embodiments, disclosed is a method comprising assigning those of another plurality of discrete scattering elements, other than a plurality of discrete scattering elements, that are located closer to one or more feed-points of an antenna be earlier in an assigned order than those of the other plurality of discrete scattering elements that are located farther from one of the one or more feed-points.

In some embodiments, disclosed is a method including assigning an order to discrete scattering elements of at least a portion of a plurality of discrete scattering elements and another plurality of discrete scattering elements, wherein assigning an order comprises assigning the order at least substantially randomly.

In some embodiments, disclosed is a method comprising modulating operational states of at least a portion of a plurality of discrete scattering elements of an antenna, wherein modulating operational states comprises modulating between three or more operational states of the portion of the plurality of discrete scattering elements.

In some embodiments, disclosed is a method comprising evaluating a performance parameter of an antenna responsive to a plurality of different empirical modulation patterns, and operating the antenna in one of the plurality of different modulation patterns, wherein evaluating the performance parameter comprises evaluating the performance parameter responsive to each possible permutation of a plurality of discrete scattering elements of the antenna operating in a plurality of different operational states, and wherein operating the antenna in one of the plurality of different empirical modulation patterns comprises operating the plurality of discrete scattering elements in a resulting empirical modulation pattern that corresponds to a best resulting (e.g., observed) performance parameter.

In some embodiments, disclosed is a method comprising evaluating a performance parameter of an antenna responsive to a plurality of different empirical modulation patterns, and operating an antenna in one of the plurality of different empirical modulation patterns, wherein evaluating the performance parameter comprises evaluating the performance parameter responsive to each of only a subset of possible permutations of discrete scattering elements operating in a plurality of different operational states, and wherein operating the antenna in one of the plurality of different empirical modulation patterns comprises operating the plurality of discrete scattering elements in a resulting empirical modulation pattern that corresponds to a best resulting performance parameter.

In some embodiments, disclosed is a method comprising computing a performance parameter using a cost function.

Figure 1B:
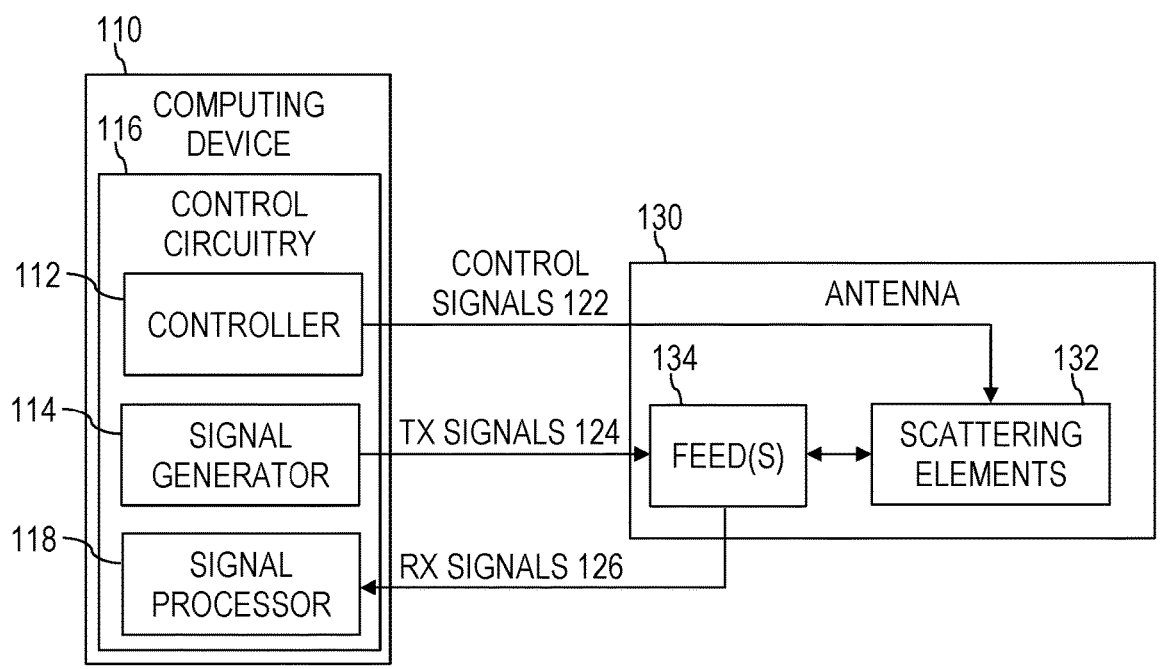

FIGS. 1A and 1B illustrate an empirically modulated antenna system 100 (hereinafter "antenna system" 100). FIG. 1A is a simplified view of the antenna system 100. FIG. 1B is a simplified block diagram of the antenna system 100. Referring to FIGS. 1A and 1B together, the antenna system 100 may include a computing device 110 operably coupled to an antenna 130. The computing device 110 may be configured to empirically modulate the antenna 130 between different states, monitor a performance parameter of the antenna over the different states, and/or operate the antenna in a certain one of the different states based, at least in part, on the performance parameter.

The antenna 130 may include a body 136 configured to propagate a reference wave (e.g., resulting from transmit (Tx) signals 124 from the computing device 110, and/or resulting from a radiative wave converted to the reference wave by the antenna 130). The body 136 may include any structure capable of propagating the reference wave (e.g., a guided wave, a surface wave, etc.). By way of non-limiting example, the body 136 may include a microstrip, a waveguide (e.g., coplanar, parallel plate, closed, tubular, other waveguides, and combinations thereof), a dielectric slab, other propagating structures, and combinations thereof.

The antenna 130 may also include one or more feed points 134-1, 134-2, . . . 134-M (sometimes referred to herein generally together as "feeds" 134, and individually as "feed" 134) operably coupled to the body 136. The feeds 134 may be configured to conduct radio frequency (RF) signals (e.g., the Tx signals 124 from the computing device 110, and the receive Rx signals 126 from the body 136) between the computing device 110 and the body 136. In some embodiments, the feeds 134 may include RF connectors. By way of non-limiting example, the feeds 134 may include a coaxial-to-microstrip connector, a coaxial-to-waveguide connector, a mode-matched transition section, other connector, and combinations thereof.

The antenna 130 may further include a plurality of discrete scattering elements 132-1, 132-2, . . . 132-N, 132-N+1, 132-N+2, 132-2×N, . . . (sometimes referred to herein generally together as "scattering elements" 132, and alone as "scattering element" 132). In some embodiments, the scattering elements 132 may be supported by the body 136 (e.g., on a surface of the body 136, in the body 136). In some embodiments, the scattering elements 132 may be otherwise secured proximate to the body 136.

The scattering elements 132 may be configured to scatter reference waves propagating through the body 136 to generate radiative waves that propagate through the air. Accordingly, the computing device 110 may transmit signals from the antenna 130 by providing Tx signals 124 to the body 136 through the feeds 134, where the scattering elements may scatter the reference waves to generate the radiative waves. Also, the scattering elements may direct energy from radiative waves propagating through the air to generate reference waves propagating through the body 136. The computing device 110 may receive the Rx signals 126 resulting from the reference waves through the feeds 134. In this way, the antenna system 100 may function as a bi-directional communication device.

The antenna 130 may include a metamaterial surface antenna technology (MSA-T) antenna. As used herein, "MSA-T antenna" refers to an antenna including scattering elements that are spaced at sub-wavelength dimensions of a functional wavelength of the antenna. Accordingly, the scattering elements 132 of the antenna 130 may be spaced at sub-wavelength dimensions of a functional wavelength of the antenna 130. Examples of MSA-T antennas are described in U.S. Patent Publications 2012/0194399, 2014/0266946, 2015/0318618, and 2015/0380828, the entire disclosure of each of which is hereby incorporated herein by reference.

As used herein, the term "functional wavelength of the antenna" 130 refers to an effective wavelength of the reference wave propagated by the body 136 while the antenna 130 is transmitting and/or receiving radiative waves. In some instances, the antenna 130 may include materials that alter the functional wavelength of the antenna (because the speed of light may vary for different materials) as the reference wave is propagated therethrough, as compared to a wavelength of the radiative waves received and transmitted by the antenna 130 through the air (e.g., the free space wavelength of the radiative waves). Accordingly, the "functional wavelength of the antenna" 130 refers specifically to the wavelength of the reference wave as it is propagated by the body 136 as opposed to the wavelength of corresponding radiative waves propagating through air or free space. Also, in some instances, the antenna 130 may function at a plurality of different frequencies, one or more ranges of frequencies, or combinations thereof. In such instances "functional wavelength of the antenna" 130 in the phrase "spaced at sub-wavelength dimensions of a functional wavelength of the antenna" 130 refers to a smallest resulting wavelength corresponding to a highest frequency of the plurality of different frequencies and/or ranges of frequencies at which the antenna 130 transmits and receives during normal operation.

In some approaches, the scattering elements 132 may be arranged in a substantially one-dimensional arrangement. As used herein the term "substantially one-dimensional" refers to elements appearing to be arranged in a line when observed from at least one perspective. For example, in some instances, a surface of the body 136 supporting the scattering elements 132 may not be completely planar (e.g., curved, textured, featured, etc.). Scattering elements 132 supported thereon, however may appear to be arranged in a line when observed from above the surface of the body 136. These scattering elements 132 would be considered herein to be arranged in a "substantially one-dimensional arrangement" even though the surface of the body 136 may be such that the scattering elements 132 supported thereon are not exactly lined up in a perfect line. As another example, the body 136 may be spherical, and the scattering elements 132 may be supported thereon in a ring around the body 136. Although a ring is two-dimensional, scattering elements 132 arranged therein may be considered to be arranged in a "substantially one-dimensional arrangement" because from a perspective collinear with a radius of the ring, the ring may appear to be one-dimensional. In addition, in some embodiments, the scattering elements 132 may be used in conjunction with other scattering elements that, when taken together, are arranged in one, two, or even three-dimensional arrangements. Accordingly, the one-dimensional arrangement of scattering elements 132 may be part of a higher-dimensional arrangement of scattering elements.

In other approaches, the scattering elements 132 may be arranged in a substantially two-dimensional arrangement. As used herein the term "substantially two-dimensional" refers to elements appearing to be arranged in a plane when observed from at least one perspective. For example, in some instances, a surface of the body 136 supporting the scattering elements 132 may not be completely planar (e.g., curved, textured, featured, etc.). Scattering elements 132 supported thereon, however may appear to be arranged in a plane when observed from above the surface of the body 136. These scattering elements 132 would be considered herein to be arranged in a "substantially two-dimensional arrangement" even though the surface of the body 136 may be such that the scattering elements 132 supported thereon are not exactly lined up in a perfect plane. As another example, the body 136 may be spherical, and the scattering elements 132 may be arranged on a segment of a surface of the body 136. Although a segment of a surface of a sphere is three-dimensional, scattering elements 132 arranged therein may be considered to be arranged in a "substantially two-dimensional arrangement" because from a perspective collinear with a radius of the spherical body 136, the segment may appear to be two-dimensional. In addition, in some embodiments, the scattering elements 132 may be used in conjunction with other scattering elements that, when taken together, are arranged in three-dimensional arrangements. Accordingly, the two-dimensional arrangement of scattering elements 132 may be part of a higher-dimensional arrangement of scattering elements 132.

In some embodiments, the scattering elements 132 may be arranged in a plurality of rows in a first direction 138-1, 138-2, . . . 138-N (sometimes referred to herein generally together as "rows" 138, and individually as "row" 138), and a plurality of rows in a second direction 139-1, 139-2, . . . (sometimes referred to herein generally together as "rows" 139, and individually as "row" 139). As shown in the example of FIG. 1A, in some embodiments, the second direction may be substantially perpendicular to the first direction. In some embodiments, however, the second direction may form any other non-zero angle with the first direction. Also, in some embodiments, the rows 138 and the rows 139 may be arranged vertically and horizontally, respectively, across the body 136, as illustrated in the example of FIG. 1A. Furthermore, in some embodiments, at least one of the rows 138 and the rows 139 may extend diagonally across the body 136.

In some embodiments, the scattering elements 132 may not be arranged in a plurality of rows 138 in a first direction and a plurality of rows 139 in a second direction. For example, the scattering elements 132 may be may be arranged in a plurality of rows in only one of a first direction and a second direction. Also by way of non-limiting example, the scattering elements 132 may not be arranged in rows. Rather, the scattering elements 132 may be ranged arbitrarily in a substantially two-dimensional arrangement.

In some embodiments, the scattering elements 132 may be spaced uniformly with a fixed distance between each of the scattering elements 132. By way of non-limiting example, the scattering elements 132 may be spaced at less than a quarter of a free-space wavelength of radiative waves transmitted by and/or received by the antenna 130. Also by way of non-limiting example, the scattering elements 132 may be spaced at less than a quarter of the functional wavelength of the antenna 130. As a further, non-limiting example, the scattering elements 132 may be spaced at less than a quarter of a free-space wavelength of radiative waves received and/or transmitted by the antenna 130. In some embodiments, the spacing of the scattering elements 132 may not be uniform.

Each of the scattering elements 132 may include structures that are substantially electrically or magnetically polarized in response to electromagnetic fields. Various different examples of scattering elements are disclosed in U.S. Patent Publication 2010/0156573 to Smith et al. filed Aug. 21, 2009 (hereinafter "Smith"), the entire disclosure of which is hereby incorporated herein by this reference. By way of non-limiting example, the scattering elements 132 may include split-ring resonators (SRRs), complementary split ring resonators (CSSRs), electric LC (ELC) resonators, complementary electric LC (CELC) resonators, omega-shaped elements, cut-wire-pair elements, other structures that are substantially electrically or magnetically polarized in response to electromagnetic fields, and combinations thereof.

Each of the scattering elements 132 may be configured to function individually in a plurality of different operational states responsive to control signals 122 from the computing device 110. In other words, electromagnetic properties of the scattering elements 132 may be adjusted responsive to the control signals 122. By way of non-limiting example, the scattering elements 132 may include elements that are adjustable responsive to voltage or current inputs (e.g., variable capacitors (varactors), transistors, diodes, etc.), tunable dielectric materials (e.g., ferroelectrics), elements that are adjustable responsive to optical inputs (e.g., photoactive materials), elements that are adjustable responsive to field inputs (e.g., nonlinear magnetic materials), elements that are adjustable responsive to mechanical inputs (e.g., microelectromechanical systems (MEMS), actuators, hydraulics), other adjustable elements, and combinations thereof. In some embodiments, the plurality of different states may include only two states (i.e., the scattering elements 132 function in a binary form). In some embodiments, the plurality of different states may include three or more discrete states (i.e., the scattering elements 132 are grayscale elements). In some embodiments, the plurality of scattering elements 132 may be adjustable continuously over a continuum of operational states (in practice, however, if adjustment elements include digital to analog or analog to digital converters (DACs and ADCs, respectively), there may technically be a finite number of discrete operational states, depending on the resolution of the DACs/ADCs across the continuum).

The computing device 110 may include control circuitry 116 including a controller 112, a signal generator 114, and a signal processor 118. The signal generator 114 may be configured to generate Tx signals 124 that are delivered to the feeds 134 of the antenna 130 for conversion to radiative signals. The signal generator 114 may be configured to process Rx signals 126 provided by the antenna 130.

The controller 112 may be configured to control the scattering elements 132 to function in the plurality of different operational states (e.g., individually, as groups, etc.). The controller 112 may also be configured to modulate the scattering elements 132 collectively in a plurality of different modulation patterns (e.g., 2-dimensional modulation patterns). The plurality of different modulation patterns may include different permutations of the scattering elements 132 operating in the plurality of different operational states.

The controller 112 may also be configured to monitor a performance parameter of the antenna responsive to the plurality of modulation patterns. The controller 112 may select one of the plurality of modulation patterns in which to operate the antenna 130 based, at least in part, on the performance parameter. The controller 112 may be configured to set the scattering elements 132 to operate in the selected modulation pattern. A detailed discussion of an example method of empirically modulating the antenna 130 is discussed below with reference to FIG. 2.

In some embodiments, the antenna 130 may be used for communicating wireless data with a far-end antenna (not shown). By way of non-limiting example, the antenna 130 may be used for transmitting, receiving, and/or combinations thereof, of wireless signals (e.g., through radiative waves).

In some embodiments, the antenna 130 may be used for at least one of transmitting and receiving power wirelessly. By way of non-limiting example, a wireless power charger may include the antenna 130 and be configured to transmit wireless power to a wirelessly powered device. Also by way of non-limiting example, a wirelessly powered device may include the antenna 130 and be configured to receive power wirelessly from a wireless power charger.

Figure 2:
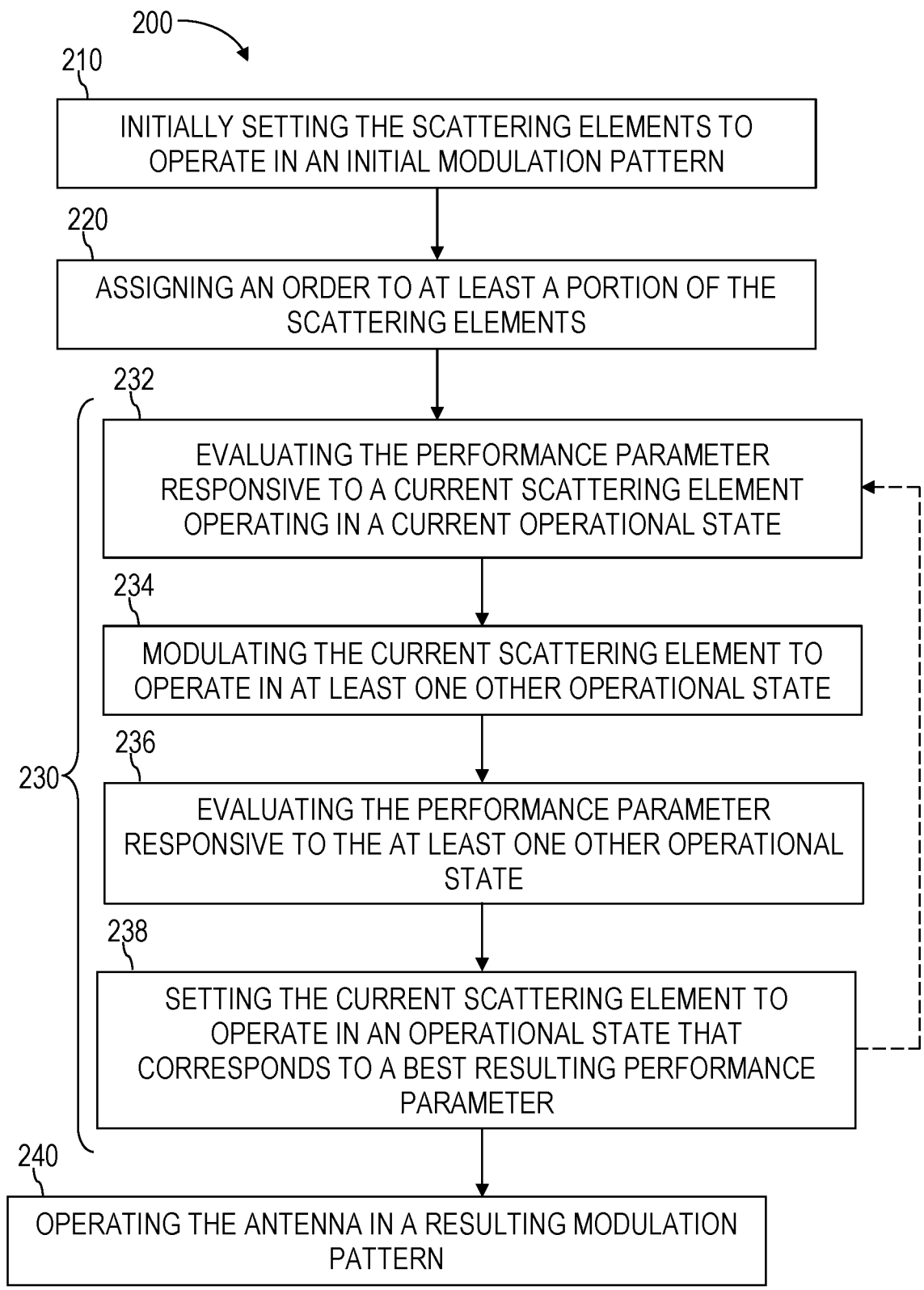
FIG. 2 a simplified flowchart of an example method of empirically modulating an antenna of the empirically modulated antenna system of FIGS. 1A and 1B.

FIG. 2 is a simplified flowchart of an example method 200 of empirically modulating the antenna 130 of FIGS. 1A and 1B. Referring to FIGS. 1A, 1B, and 2 together, the method 200 may include initially setting 210 the scattering elements 132 to operate in an initial modulation pattern. In some embodiments, setting 210 the scattering elements 132 to operate in an initial modulation pattern may include setting each of the scattering elements 132 to operate in a same one of the plurality of different operational states.

In some embodiments, setting 210 the scattering elements 132 to operate in an initial modulation pattern may include setting the scattering elements 132 to operate in a naïve holographic modulation pattern. As used herein, the term "naïve holographic pattern" refers to a modulation pattern of the antenna 130 that is derived using holographic beamforming principles, including microwave holographic beamforming principles. By way of non-limiting example, a surface modulation function described by a hologram $\Psi_{holo}$ may be determined using the mathematical expression:

$$\psi_{holo} = \frac{E_{ref} E_{rad}}{|E_{ref}|^2},$$

which is disclosed and discussed in more detail in Ebadi S., Driscoll T. and Smith D., "Visual Illustration of Microwave Holographic Beamforming using a Modulated Surface-Impedance Metamaterial," Proc. Antennas & Propagation Society International Symposium (APSURSI 2013), pp. 2343-2344, IEEE, 2013 (hereinafter "Ebadi"). The entire disclosure of Ebadi is hereby incorporated herein by this reference. $E_{ref}$ may be the reference wave propagated by the body 136, and $E_{rad}$ may be the radiative wave propagating through the air. If both $E_{ref}$ and $E_{rad}$ are normalized, the function $\Psi_{holo}$ may take on any value in the complex plane in a circle with magnitude less than 1, depending on the capability of the scattering elements 132. Accordingly, the modulation function may be adjusted to reflect modulation values the scattering elements are capable of achieving. Also, a surface of the body 136 may be discretely sampled at fixed locations, leading any choice of modulation pattern to be a sampled approximation of a desired continuous modulation pattern. Further complications may arise as element spacing is reduced. For example, mutual coupling, where a response of an individual scattering element 132 is perturbed by neighboring scattering elements 132, may become stronger as the density of the placement of the scattering elements 132 increases. The dispersion characteristics of the reference wave $E_{ref}$ may be thus altered, making pre-calculation of the naïve holographic pattern less trivial than the above expression suggests.

In some embodiments, setting 210 the scattering elements 132 to operate in an initial modulation pattern may include setting each of the scattering elements 132 to operate in a previously-used modulation pattern. In such embodiments, the computing device 110 may store information indicating previously-used modulation patterns. By way of non-limiting example, the computing device 110 may be configured to automatically set the scattering elements 132 to operate in one of the previously used modulation patterns (e.g., based on geographic information for the antenna 130 and a far-end antenna 130 that it is desired to transmit and receive radiative waves to and from). As a specific, non-limiting example, the computing device 110 may include a Global Positioning System (GPS) (not shown), and the computing device may store previously-used modulation patterns associated with location data from the GPS. The computing device 110 may set the scattering elements 132 to operate in one of the previously-used modulation patterns that is associated with GPS data that matches a current location of the antenna. Also by way of non-limiting example, the computing device 110 may be configured to receive user inputs (e.g., through a touchscreen, button(s), keys, a pointing device, other input device, and combinations thereof) indicating a previously used modulation pattern, and initially set the scattering elements 132 to operate in the selected previously used modulation pattern.

In some embodiments, setting 210 the scattering elements 132 to operate in an initial modulation pattern may include setting each of the scattering elements 132 to operate in an at least substantially random modulation pattern. As used herein, the term "substantially random" refers to completely random, pseudorandom, and combinations thereof. By way of non-limiting example, a random number generator (e.g., a physical random number generator such as a resistor noise random number generator, a software random number generator module, etc.) may be used to randomly determine which of the plurality of different operational states the scattering elements 132 should be set to.

The method 200 may also include assigning 220 an order to at least a portion of the scattering elements 132 from a first scattering element 132 to a last scattering element 132. In some embodiments, the computing device 110 may be programmed to assign a scattering element 132 that is located closest to a feed 134 of the antenna 130 to be the first scattering element 132. As used herein, the terms "located closest," and "proximate" when used with reference to the scattering elements 132 relative to the feeds 134, refers to an electrical distance that signals delivered to the feeds 134 travel to reach the scattering elements 132, in contrast to a physical proximity. The first scattering element 132 may often (but not necessarily) be both physically the most proximate scattering element 132 to the feed 134 and "located closest" to the feed 134.

In some embodiments, the computing device 110 may be programmed to assign the order row-by-row (e.g., row-by-row in one of the first direction (rows 138), the second direction (rows 139), other directions, etc.) starting with a first row 138 or 139 and ending with a last row 138 or 139. In other words, each of the scattering elements 132 in the first row 138 or 139 may be assigned to be earlier in the order than the scattering elements in a second row 138 or 139, and so on, and each of the scattering elements 132 in the last row 138 or 139 may be assigned to be later in the order than the scattering elements in the previous rows 138 or 139. By way of non-limiting example, the computing device 110 may be programmed to assign the order row-by-row starting with a first row 138-1 in the first direction, and ending with a last row 138-N in the first direction. Also by way of non-limiting example, the computing device 110 may be programmed to assign the order row-by-row starting with a first row 139-1 in the second direction, and ending with a last row 139 in the second direction.

In some embodiments, the computing device 110 may be programmed to assign the order proportionally to electrical proximity of the discrete scattering elements 132 to one of the feeds 134 of the antenna 130. In other words, the computing device 110 may be programmed to assign scattering elements that are located closest to the feeds 134 of the antenna 130 to be earliest in the assigned order. By way of non-limiting example, the antenna 130 may include only a single feed 134. Also by way of non-limiting example, the antenna 130 may include multiple feeds 134, and the electrical proximity of each of the scattering elements 132 to a nearest feed 134 may be assessed, and the order assigned accordingly.

In some of the embodiments where the order is assigned row-by-row, the first row 138 or 139 may include a row 138 or 139 that is located closest to one or more feeds 134 of the antenna 130. In other words, the first through the last row 138 or 139 may include a closest row 138 or 139 to the one or more feeds 134 through a farthest row 138 or 139 from the feeds 134, respectively. As used herein, the terms "located closest," "located farthest," and "proximate" when used with reference to the scattering elements 132 and rows 138, 139 relative to the feeds 134, refers to an electrical distance that signals delivered to the feeds 134 travel to reach the scattering elements 132 and rows 138 or 139, respectively, in contrast to a physical proximity. For example, the scattering element 132 that is closest to a given feed 134 may often (but not necessarily) be both physically the most proximate scattering element 132 to the feed 134 and "located closest" to the feed 134. In some embodiments, a row 138 or 139 that is located closest to a given feed 134 may include a row 138 or 139 that includes scattering elements 132 that, on average, are located closest to the feed 134. In embodiments where there are multiple feeds 134-M, the first row 138 or 139 may be selected based on an average of the distances of the rows 138 or 139 from each of the one or more feeds 134. By way of non-limiting example, in the example of FIG. 1A, row 138-1 may be closest, on average, to each of the feeds 134-1, 134-2, and 134-M. Accordingly, the computing device 110 may select row 138-1 to be the first row, and assign each of the scattering elements 132 in row 138-1 to be earlier in the assigned order than the scattering elements 132 in the other rows 138-2, . . . 138-N. Also, row 138-N may be furthest, on average, from each of the feeds 134-1, 134-2, and 134-M. Accordingly, the computing device 110 may select row 138-N to be the last row in the assigned order, and each of the scattering elements 132 in row 138-N may be assigned to be later in the assigned order than the scattering elements 132 in the previous rows.

In some of the embodiments where the order is assigned row-by-row, the computing device 110 may be programmed to assign an order of the rows 138 or 139 at least substantially randomly.

In some of the embodiments where the order is assigned row-by-row, the scattering elements 132 within each of the rows 138 or 139 that are located closer to the feeds 134 of the antenna 130 than others of the scattering elements 132 within the same row 138, 139 may be assigned to be earlier in the order than the others of the scattering elements within the same row 138 or 139. For example, a scattering element 132 within a first row 138 or 139 that is located closest to the feeds 134 may be assigned to be the first scattering element 132. Also, a scattering element 132 in a last row 138 or 139 that is located farthest from the feeds 134 may be assigned to be the last scattering elements 132.

In some of the embodiments where the order is assigned row-by-row, the order of the scattering elements 132 within each of the rows 138 or 139 may be assigned at least substantially randomly. In some embodiments, the computing device 110 may be programmed to assign the order of the scattering elements 132 across diagonals through the scattering elements 132. In some embodiments where the order is assigned row-by-row, the order of the scattering elements 132 within each of the rows 138 or 139 may be assigned in the order in which they are located on the body 136 from one end of the body 136 to an opposite end of the body 136

In some embodiments, the order may not be assigned row-by-row. By way of non-limiting example, the computing device 110 may be programmed to assign the order of the scattering elements 132 to be proportional to electrical proximity of each of the scattering elements 132 to one or more of the feeds 134 of the antenna 130, regardless of which rows 138, 139 they belong to. In other words, the computing device 110 may be programmed to assign scattering elements 132 that are located closest to the feeds 134 of the antenna 130 to be earliest in the assigned order. As a specific, non-limiting, the antenna 130 may include only a single feed 134. Also by way of non-limiting example, the antenna 130 may include multiple feeds 134, and the electrical proximity of each of the scattering elements 132 to a nearest feed 134 may be assessed, and the order assigned accordingly, regardless of the rows 138, 139 the scattering elements 132 belong to.

In some embodiments, the computing device 110 may be programmed to assign the order to the scattering elements 132 at least substantially randomly. By way of non-limiting example, the computing device 110 may include a random number generator, and use the random number generator to assign the order at least substantially randomly. In some embodiments, the computing device 110 may be programmed to assign the order across diagonals through the scattering elements 132.

In some embodiments, the scattering elements 132 may not be arranged in rows 138 or 139. In such embodiments, the order may be assigned according to proximity of the scattering elements 132 to the feeds, randomly, or according to some other ordering method.

The method 200 may further include performing 230, for each scattering element 132 of the portion, starting with the first discrete scattering element 132 and progressing in the assigned order through the portion, operations 232, 234, 236, and 238, as described in more detail below.

For each scattering element 132 of the portion in the assigned order, performing 230 may include evaluating 232 the performance parameter responsive to a current scattering element 132 operating in a current one of the plurality of different operational states. In some embodiments, the performance parameter may include a gain value of a transmit-receive link between the antenna 130 and a far-end antenna (e.g., a far-end communication antenna, a far-end wireless power conducting antenna, etc.). In some embodiments, the performance parameter may include a received signal strength parameter. In some embodiments, the performance parameter may be computed using a cost function.

In some embodiments, the antenna 130 may include a communication antenna. In such embodiments, the performance parameter may include a Received Signal Strength Indicator (RSSI) indicating a received signal strength of a transmitted signal transmitted by one of the antenna 130 and a far-end antenna, and received at the other of the antenna 130 and the far-end antenna. In embodiments where the RSSI indicates a received signal strength of a transmitted signal transmitted by the far-end antenna and received by the antenna 130, the RSSI may be determined by the computing device 110 simply by analyzing the transmitted signal received by the antenna 130. In embodiments where the RSSI indicates a received signal strength of a transmitted signal transmitted by the antenna 130 and received by the far-end antenna, however, the RSSI may be determined at the far-end, and transmitted to the antenna 130 (e.g., wirelessly between the far-end antenna and the antenna 130, through a secondary communication link (e.g., a secondary wireless link, a wired link, etc.), or combinations thereof).

In some embodiments, the transmitted signal that is used to determine the RSSI may include a training signal. By way of non-limiting example, the training signal may include a simple sinusoidal tone. Also by way of non-limiting example, the training signal may include a modulated signal (e.g., amplitude modulation, phase modulation, frequency modulation, code division modulation, other modulations, or combinations thereof), that is similar to a data signal that would be transmitted from the antenna 130 to the far-end antenna. As a further non-limiting example, the training signal may include a pseudo-random sequence that may allow for robust signal detection even in relatively noisy environments. In some embodiments, the transmitted signal may instead include a communication signal including communication data transmitted between the antenna and the far-end antenna.

For each scattering element 132 of the portion in the assigned order, performing 230 may also include modulating 234 the current scattering element 132 to operate in at least one of the others of the plurality of different operational states. In some embodiments, the computing device may modulate the current scattering element 132 to operate in each of the others of the plurality of different operational states. In some embodiments, however, the computing device may modulate the current scattering element 132 to operate in less than all of the others of the plurality of different operational states. By way of non-limiting example, a four-digit binary number (i.e., capable of indicating 16 different operational states) may be used to indicate a current operational state of the current scattering elements 132. A transition from a binary 7 (0111) to a binary 8 (1000) may be used, in contrast to a change in a single bit.

For each scattering element 132 of the portion in the assigned order, performing 230 may further include evaluating 236 the performance parameter responsive to each of the at least one of the others of the plurality of different operational states. In addition, for each scattering element 132 in the assigned order, performing 230 may include setting 238 the current scattering element 132 to operate in an operational state that corresponds to a best resulting performance parameter.

In some embodiments, performing 230 operations 232, 234, 236, and 238 may include repeatedly progressing through the scattering elements 132 in the assigned order.

In some embodiments, the computing device 110 may be programmed to stop progressing through the scattering elements 132 after progressing through each of the scattering elements 132 a predetermined number of times (e.g., one time, two times, three times, etc.). In some embodiments, the computing device 110 may be programmed to stop progressing through the scattering elements 132 when the performance parameter improves beyond a predetermined threshold. In some embodiments, the computing device 110 may be programmed to stop progressing through the scattering elements 132 when improvements in the performance parameter level out (e.g., improvement in the performance parameter decreases below a predetermined threshold). In some embodiments, the computing device 110 may be programmed to stop progressing through the scattering elements 132 only after every possible modulation pattern has been empirically tested (e.g., where there is a small number of scattering elements 132).

In some embodiments, the computing device 110 may be programmed to reassign an order to the scattering elements 132 after progressing through the scattering elements 132 a certain number of times (e.g., one time, two times, three times, etc.) in the assigned order. By way of non-limiting example, after progressing through the scattering elements 132 according to operation 230 in a row-by-row order in the first direction (i.e., rows 138 of FIG. 1A), the computing device 110 may reorder the scattering elements 132 row-by-row in the second direction (i.e., rows 139 of FIG. 1A) and continue progressing through the scattering elements 132.

The method 200 may also include operating 240 the antenna 130. In some embodiments, operating 240 the antenna 130 may include operating the antenna 130 after the computing device 110 stops progressing through the scattering elements 132 (i.e., operation 230, which includes operations 232, 234, 236, and 238), and operating the antenna 130 in a resulting modulation pattern. In some embodiments, operating 240 the antenna 130 may include operating the antenna 130 during progression through the scattering elements 132. By way of non-limiting example, if the antenna 130 is used to communicate during operation 230, performance of the antenna 130 may improve, on average, over time. Also by way of non-limiting example, if the antenna 130 is used to wirelessly conduct power in a wireless power system during operation 230, charging of a battery in a wirelessly powered device may accelerate over time (i.e., more charge per unit time).

The antenna system 100 and method 200 may provide a simple empirical way to tune the antenna 130 without complicated algorithms designed to deterministically predict optimal tuning for the antenna 130. Preliminary testing suggests that, when tuned as discussed above, the antenna 130 may relatively quickly achieve comparable performance to that resulting from complicated optimization algorithms. Also, complicating physical realities such as, for example, mutual coupling, do not need to be addressed because the empirical tuning accounts for all such complicating physical realities. Although there may be some risk that empirical solutions, such as those discussed above, may sometimes resolve to local extrema (e.g., of the performance parameter) instead of global extrema, acceptable results may still be consistently obtained if the antenna 130 is initially set 210 to operate in a carefully selected modulation pattern (e.g., a naïve holographic modulation pattern). Preliminary analyses suggest that when a naïve holographic modulation pattern is used, good locally optimized points may be reached after progressing through the scattering elements 132 (i.e., in operation 230) about three times. Preliminary analyses also suggest that when blind initial modulation patterns are used, four to five progressions through the scattering elements 132 may be used to reach a relatively good locally optimized point.

Figure 3A:
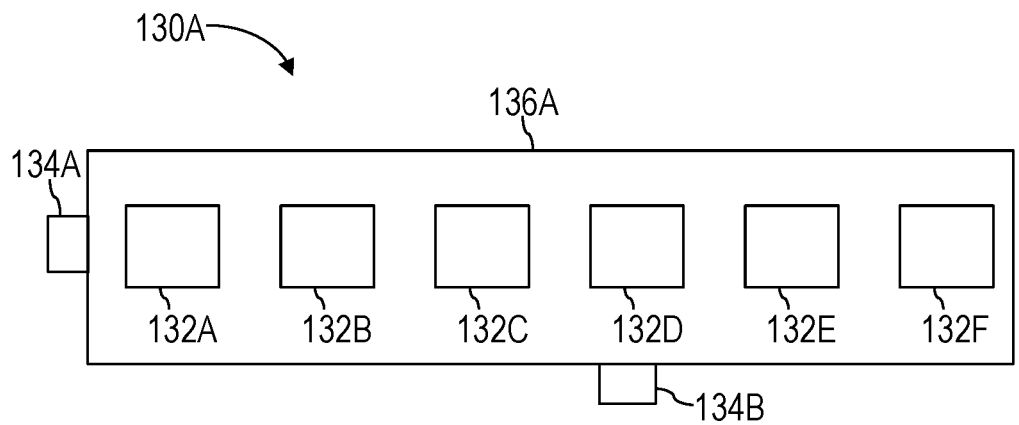
FIG. 3A is a non-limiting example antenna including multiple feeds that may be used in the empirically modulated antenna system of FIGS. 1A and 1B.

FIG. 3A is a non-limiting example antenna 130A (hereinafter "antenna" 130A) including multiple feeds 134A, 134B that may be used in the antenna system 100 of FIGS. 1A and 1B. The antenna 130A includes a body 136A, feeds 134A, 134B, and scattering elements 132A-132F, which may be similar to the body 136, the feeds 134, and scattering elements 132 discussed above with reference to FIGS. 1A and 1B. As illustrated in FIG. 3A, the scattering elements 132A-132F may be arranged in a substantially one-dimensional arrangement.

Empirical tuning of the antenna 130A may proceed as discussed above with reference to the method 200 of FIG. 2. For example, an order may be assigned 220 (FIG. 2) to the scattering elements 132A-132F. By way of non-limiting example, those of the scattering elements 132A-132F that are located closest to one of the feeds 134A, 134B may be assigned to be earliest in the order, and those of the scattering elements 132A-132F that are located furthest from the feeds 134A, 134B may be assigned to be latest in the order. Accordingly, scattering element 132A may be first (i.e., because it is closer to feed 134A than any of the other scattering elements 132B-132F are located to either of feeds 134A and 134B), scattering element 132D may be second (i.e., because it is closer to feed 134B than any of scattering elements 132C-132F are to either of feeds 134A and 134B), scattering element 132C may be third, scattering element 132E may be fourth, scattering element 132B may be fifth, and scattering element 132F may be sixth.

Of course, the scattering elements 132A-132F may be assigned a different order in some embodiments (e.g., randomly), as discussed above with reference to FIG. 2. Some advantages, however, may result from assigning the order based on electrical distance from the feeds 134A, 134B to the scattering elements 132A-132F. For example, initial analyses suggest that modulation of those of the scattering elements 132A-132F that are located closest to the feeds 134A, 134B may have more profound effects on performance parameters than modulation of those of the scattering elements 132A-132F that are located farthest from the feeds 134A, 134B. Accordingly, placing those of the scattering elements 132A-132F that are located closest to the feeds 134A, 134B earlier in the order may reduce the probability of the method 200 of FIG. 2 resulting in getting "stuck" in local extrema for the performance parameter instead of achieving more global extrema.

Figure 3B:
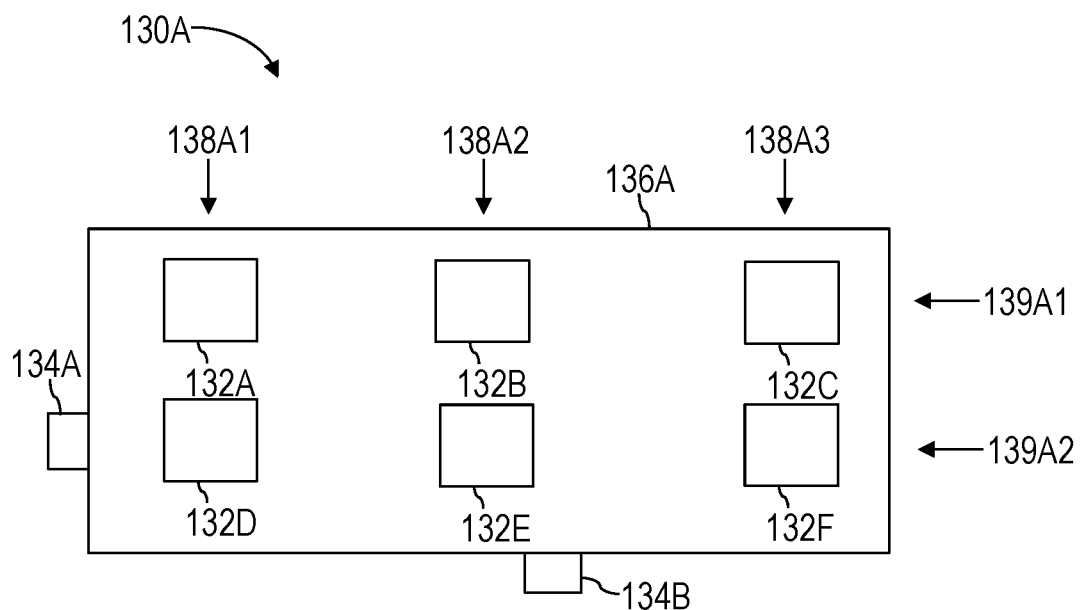
FIG. 3B is a non-limiting example antenna including multiple feeds that may be used in the empirically modulated antenna system of FIGS. 1A and 1B.

FIG. 3B is a non-limiting example antenna 130A (hereinafter "antenna" 130A) including multiple feeds 134A, 134B that may be used in the antenna system 100 of FIGS. 1A and 1B. The antenna 130A includes a body 136A, feeds 134A, 134B, and scattering elements 132A-132F, which may be similar to the body 136, the feeds 134, and scattering elements 132 discussed above with reference to FIGS. 1A and 1B. As illustrated in FIG. 3B, the scattering elements 132A-132F may be arranged in a substantially two-dimensional arrangement in rows 138A1, 138A2, and 138A3 in a first direction, and rows 139A1 and 139A2 in a second direction.

Empirical tuning of the antenna 130A may proceed as discussed above with reference to the method 200 of FIG. 2. For example, an order may be assigned 220 (FIG. 2) to the scattering elements 132A-132F. By way of non-limiting example, the order may be assigned row-by-row in the first direction (i.e., rows 138A1, 138A2, and 138A3), and according to the proximity of the rows 138A1, 138A2, and 138A3 to the feeds 134A, 134B. Accordingly, the scattering elements 132A, 132D of row 138A1 may be ordered earliest, the scattering elements 132B, 132E of row 138A2 may be ordered next, and the scattering elements 132C, 132F of row 138A3 may be ordered last. If the scattering elements 132 within each row 138 are ordered according to their proximity to the feeds 134, the resulting order may be scattering element 132D first, scattering element 132A second, scattering element 132E third, scattering element 132B fourth, scattering element 132F fifth, and scattering element 132C sixth.

Also by way of non-limiting example, the order may be assigned row-by-row in the second direction (i.e., rows 139A1 and 139A2), and according to the proximity of the rows 139A1 and 139A2 to the feeds 134A, 134B. Accordingly, the scattering elements 132D, 132E, and 132F of row 139A2 may be ordered earliest, and the scattering elements 132A, 132B, and 132C of row 139A1 may be ordered last. If the scattering elements 132 within each row 139 are ordered according to their proximity to the feeds 134, the resulting order may be scattering element 132D first, scattering element 132E second, scattering element 132F third, scattering element 132A fourth, scattering element 132B fifth, and scattering element 132C sixth.

As a further non-limiting example, those of the scattering elements 132A-132F that are located closest to one of the feeds 134A, 134B may be assigned to be earliest in the order, and those of the scattering elements 132A-132F that are located furthest from the feeds 134A, 134B may be assigned to be latest in the order, regardless of the rows 138, 139. Accordingly, scattering element 132A may be first (i.e., because it is closer to feed 134A than any of the other scattering elements 132B-132F are located to either of feeds 134A and 134B), scattering element 132E may be second (i.e., because it is closer to feed 134B than any of scattering elements 132C-132F are to either of feeds 134A and 134B), scattering element 132A may be third, scattering element 132B may be fourth, scattering element 132F may be fifth, and scattering element 132C may be sixth.

Of course, the scattering elements 132A-132F may be assigned a different order in some embodiments (e.g., randomly, across a diagonal, etc.), as discussed above with reference to FIG. 2. Some advantages, however, may result from assigning the order based on electrical distance from the feeds 134A, 134B to the scattering elements 132A-132F. For example, initial analyses suggest that modulation of those of the scattering elements 132A-132F that are located closest to the feeds 134A, 134B may have more profound effects on performance parameters than modulation of those of the scattering elements 132A-132F that are located farthest from the feeds 134A, 134B. Accordingly, assigning those of the scattering elements 132A-132F that are located closest to the feeds 134A, 134B earlier in the order may reduce the probability of the method 200 of FIG. 2 resulting in getting "stuck" in local extrema for the performance parameter instead of achieving more global extrema.

Figure 4A:
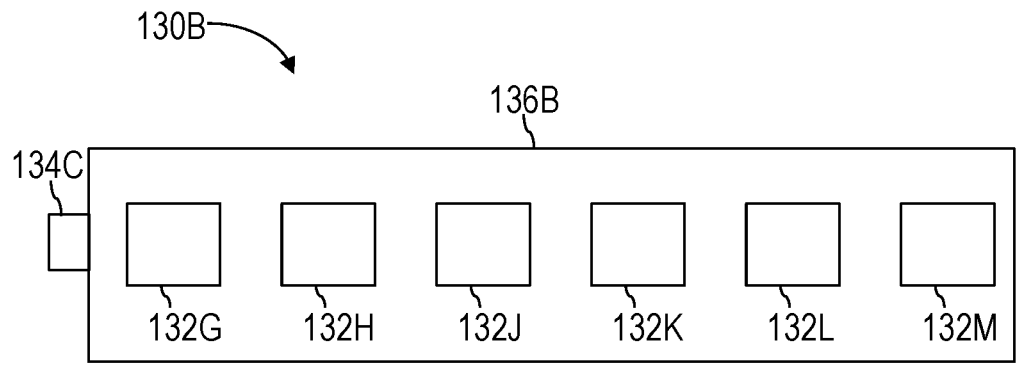
FIG. 4A is a non-limiting example antenna including a single feed that may be used in the empirically modulated antenna system of FIGS. 1A and 1B.

FIG. 4A is a non-limiting example antenna 130B (hereinafter "antenna" 130B) having a single feed 134C that may be used in the antenna system of FIGS. 1A and 1B. The antenna 130B may be similar to the antenna 130A of FIG. 3 except that the antenna 130B may only include a single feed 134C instead of multiple feeds 134A, 134B. For example, the antenna 130B may include a body 136B, the feed 134C, and scattering elements 132G-132M arranged in a substantially one-dimensional arrangement. The body 136B, the feed 134C, and the scattering elements 132G-132M may be similar to the body 136, the feeds 134, and the scattering elements 132 discussed above with reference to FIGS. 1A and 1B.

Similar to the antenna 130A, empirical tuning of the antenna 130B may proceed as discussed above with reference to the method 200 of FIG. 2. For example, an order may be assigned 220 (FIG. 2) to the scattering elements 132G-132M. By way of non-limiting example, those of the scattering elements 132G-132M that are located closest to the feed 134C may be assigned to be earliest in the order, and those of the scattering elements 132G-132M that are located furthest from the feed 134C may be assigned to be latest in the order. Accordingly, scattering element 132G may be first, scattering element 132H may be second, scattering element 132J may be third, scattering element 132K may be fourth, scattering element 132L may be fifth, and scattering element 132M may be sixth. Of course, the scattering elements 132G-132M may be assigned a different order in some embodiments (e.g., randomly), as discussed above with reference to FIG. 2.

Figure 5A:
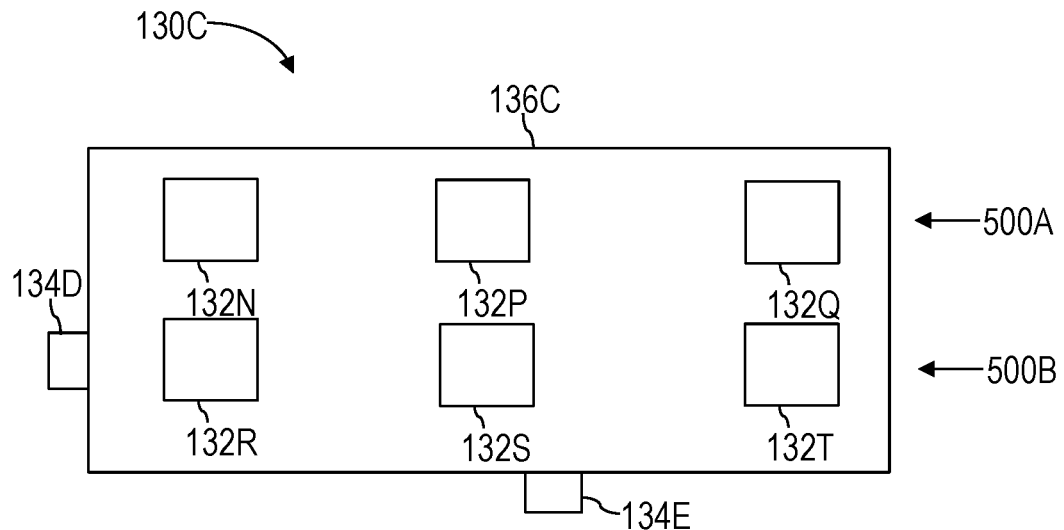
FIG. 5A is a non-limiting example antenna including two rows of scattering elements that may be used in the empirically modulated antenna system of FIGS. 1A and 1B.
Figure 5B:
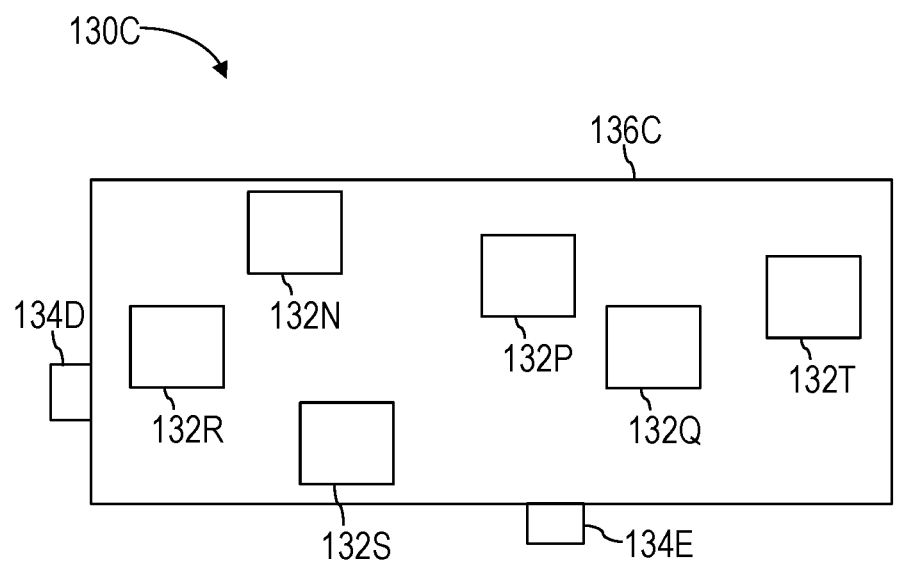
FIG. 5B is a non-limiting example antenna including scattering elements arranged in a somewhat arbitrary two-dimensional arrangement, without rows, and that may be used in the empirically modulated antenna system of FIGS. 1A and 1B.

In some embodiments, in addition to the scattering elements 132 arranged in a substantially one-dimensional arrangement, the antenna 130 may also include one or more other pluralities of scattering elements arranged in substantially one-dimensional arrangements. For example, FIG. 5A is a non-limiting example antenna 130C (hereinafter "antenna" 130C) including two rows 500A, 500B of scattering elements 132N-132Q and 132R-132T, respectively. Each of the rows 500A, 500B may be arranged in a substantially one-dimensional arrangement. Although the rows 500A and 500B of FIG. 5A are shown as arranged in parallel to each other, the current disclosure is not so limited. It is also contemplated herein that in some embodiments, rows of scattering elements may form any angle with each other.

Figure 4B:
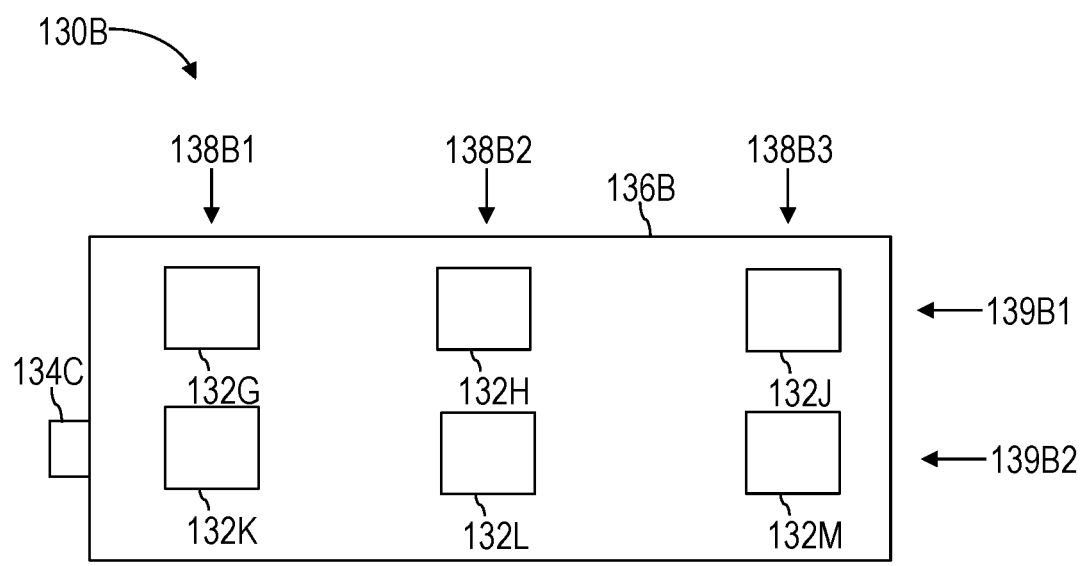
FIG. 4B is a non-limiting example antenna including a single feed that may be used in the empirically modulated antenna system of FIGS. 1A and 1B.

FIG. 4B is a non-limiting example antenna 130B (hereinafter "antenna" 130B) having a single feed 134C that may be used in the antenna system of FIGS. 1A and 1B. The antenna 130B may be similar to the antenna 130A of FIG. 3 except that the antenna 130B may only include a single feed 134C instead of multiple feeds 134A, 134B. For example, the antenna 130B may include a body 136B, the feed 134C, and scattering elements 132G-132M arranged in a substantially two-dimensional arrangement. The body 136B, the feed 134C, and the scattering elements 132G-132M may be similar to the body 136, the feeds 134, and the scattering elements 132 discussed above with reference to FIGS. 1A and 1B.

Similar to the antenna 130A, empirical tuning of the antenna 130B may proceed as discussed above with reference to the method 200 of FIG. 2. For example, an order may be assigned 220 (FIG. 2) to the scattering elements 132G-132M. By way of non-limiting example, the order may be assigned row-by-row in the first direction (i.e., rows 138B1, 138B2, and 138B3), and according to the proximity of the rows 138B1, 138B2, and 138B3 to the feed 134C. Accordingly, the scattering elements 132G, 132K of row 138B1 may be ordered earliest, the scattering elements 132H, 132L of row 138B2 may be ordered next, and the scattering elements 132J, 132M of row 138B3 may be ordered last. If the scattering elements 132 within each row 138 are ordered according to their proximity to the feed 134C, the resulting order may be scattering element 132K first, scattering element 132G second, scattering element 132L third, scattering element 132H fourth, scattering element 132M fifth, and scattering element 132J sixth.

Also by way of non-limiting example, the order may be assigned row-by-row in the second direction (i.e., rows 139B1 and 139B2), and according to the proximity of the rows 139B1 and 139B2 to the feed 134C. Accordingly, the scattering elements 132K, 132L, and 132M of row 139B2 may be ordered earliest, and the scattering elements 132G, 132H, and 132J of row 139B1 may be ordered last. If the scattering elements 132 within each row 139 are ordered according to their proximity to the feed 134C, the resulting order may be scattering element 132K first, scattering element 132L second, scattering element 132M third, scattering element 132G fourth, scattering element 132H fifth, and scattering element 132J sixth.

As a further, non-limiting example, those of the scattering elements 132G-132M that are located closest to the feed 134C may be assigned to be earliest in the order, and those of the scattering elements 132G-132M that are located furthest from the feed 134C may be assigned to be latest in the order, regardless of what rows 138, 139 they belong to. Accordingly, scattering element 132K may be first, scattering element 132G may be second, scattering element 132L may be third, scattering element 132H may be fourth, scattering element 132M may be fifth, and scattering element 132J may be sixth. Of course, the scattering elements 132G-132M may be assigned a different order in some embodiments (e.g., randomly, across a diagonal, etc.), as discussed above with reference to FIG. 2.

FIG. 5A is a non-limiting example antenna 130C (hereinafter "antenna" 130C) including scattering elements 132N-132T arranged in rows. The antenna 130C may also include a body 136C, and one or more feeds 134D, 134E. Although the antenna 130C of FIG. 5A is shown having two feeds 134D, 134E, it is contemplated within the disclosure that the antenna 130C may include only a single feed, two feeds, or any number of feeds greater than two. The body 136C, the scattering elements 132N-132T, and the feeds 134D, 134E may be similar to the body 136, the scattering elements 132, and the feeds 134, respectively, as discussed above with reference to FIGS. 1A and 1B.

Collectively, the scattering elements 132N-132T may be configured to function in a plurality of different modulation patterns including different permutations of the scattering elements 132N-132T operating in the plurality of different operational states.

Similar to the antenna 130A, empirical tuning of the antenna 130C may proceed as discussed above with reference to the method 200 of FIG. 2. For example, an order may be assigned 220 (FIG. 2) to the scattering elements 132N-132T. In some embodiments, the order may be assigned to the scattering elements 132N-132T row-by-row. By way of non-limiting example, one of the rows 500A and 500B that includes scattering elements 132N-132T that are, on average, closest to the feeds 134D, 134E may be earliest in the assigned order. In the example antenna 130C of FIG. 5A, the scattering elements 132R-132T of row 500B may be, on average, located closer to the feeds 134D and 134E than the scattering elements 132N-132Q of row 500A. Accordingly, the scattering elements 132R-132T of row 500B may be assigned to be earlier in the order than the scattering elements 132N-132Q of row 500A. Also, within each of the rows 500A and 500B, the scattering elements 132N-132T may be ordered based on how closely they are located to the feeds 134D and 134E. For example, in the example antenna 130C of FIG. 5A, the scattering element 132R may be first, scattering element 132S may be second, scattering element 132T may be third, scattering element 132P may be fourth, scattering element 132N may be fifth, and scattering element 132Q may be sixth in the assigned order.

In some embodiments, the order may be assigned without regard to rows 500A, 500B. By way of non-limiting example, those of the scattering elements 132N-132T that are located closest to the feeds 134D and 134E may be assigned to be earliest in the order, and those of the scattering elements 132N-132T that are located furthest from the feeds 134D and 134E may be assigned to be latest in the order, regardless if which row 500A, 500B they belong to. Accordingly, scattering element 132R may be first, scattering element 132S may be second, scattering element 132N may be third, scattering element 132P may be fourth, scattering element 132T may be fifth, and scattering element 132Q may be sixth in the assigned order.

Of course, the scattering elements 132N-132T may be assigned a different order in some embodiments (e.g., randomly), as discussed above with reference to FIG. 2.

FIG. 5N is a non-limiting example antenna 130C (hereinafter "antenna" 130C) including scattering elements 132N-132T arranged in a somewhat arbitrary two-dimensional arrangement, without rows. The antenna 130C may also include a body 136C, and one or more feeds 134D, 134E. Although the antenna 130C of FIG. 5N is shown having two feeds 134D, 134E, it is contemplated within the disclosure that the antenna 130C may include only a single feed, two feeds, or any number of feeds greater than two. The body 136C, the scattering elements 132N-132T, and the feeds 134D, 134E may be similar to the body 136, the scattering elements 132, and the feeds 134, respectively, as discussed above with reference to FIGS. 1A and 1B.

Similar to the antennas 130A, 130B of FIGS. 3B and 4B, respectively, empirical tuning of the antenna 130C may proceed as discussed above with reference to the method 200 of FIG. 2. For example, an order may be assigned 220 (FIG. 2) to the scattering elements 132N-132T according to their proximity to the feeds 134D, 134E. Those of the scattering elements 132N-132T that are located closest to the feeds 134D, 134E may be assigned to be earliest in the order, and those of the scattering elements 132N-132T that are located furthest from the feeds 134D, 134E may be assigned to be latest in the order. Accordingly, scattering element 132R may be first, scattering element 132Q may be second, scattering element 132S may be third, scattering element 132N may be fourth, scattering element 132P may be fifth, and scattering element 132T may be sixth. Of course, the scattering elements 132G-132M may be assigned a different order in some embodiments (e.g., randomly, etc.), as discussed above with reference to FIG. 2.

Figure 6:
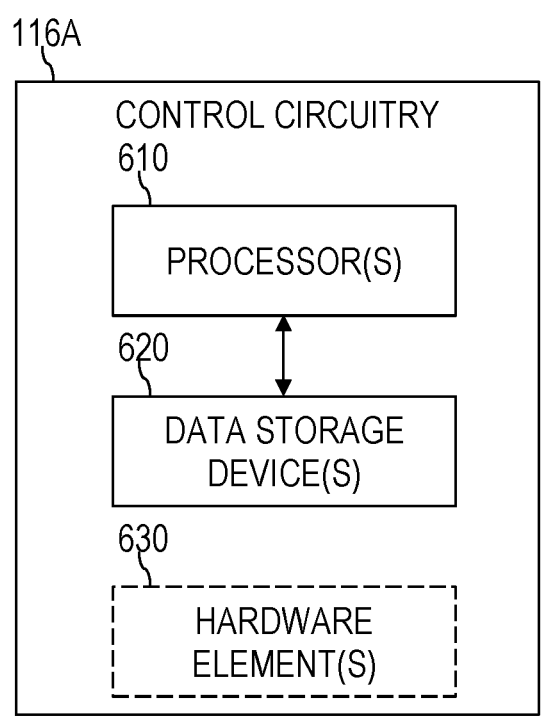
FIG. 6 is a simplified block diagram of example control circuitry that may be used in a computing device of the empirically modulated antenna system of FIGS. 1A and 1B.

FIG. 6 is a simplified block diagram of example control circuitry 116A (hereinafter "control circuitry" 116A) that may be used in a computing device 110 of the antenna system of FIGS. 1A and 1B. The control circuitry 116A may include at least one processor 610 (hereinafter referred to simply as "processor" 610) operably coupled to at least one data storage device 620 (hereinafter referred to simply as "storage" 620). The storage 620 may include at least one non-transitory computer-readable medium, By way of non-limiting example, the storage 620 may include one or more volatile data storage devices (e.g., Random Access Memory (RAM)), one or more non-volatile data storage devices (e.g., Flash, Electrically Programmable Read Only Memory (EPROM), a hard drive, a solid state drive, magnetic discs, optical discs, etc.), other data storage devices, and combinations thereof.

The storage 620 may also include data corresponding to computer-readable instructions stored thereon. The computer-readable instructions may be configured to instruct the processor 610 to execute at least a portion of the functions that the computing device 110 (FIGS. 1A and 1B) is configured to perform. By way of non-limiting example, the computer-readable instructions may be configured to instruct the processor 610 to execute at least a portion of the functions of at least one of the signal generator 114, the signal processor 118, and the controller 112 (e.g., at least a portion of the functions discussed with reference to the method 200 of FIG. 2) of FIGS. 1A and 1B.

The processor 610 may include a Central Processing Unit (CPU), a microcontroller, a Programmable Logic Controller (PLC), other programmable device, or combinations thereof. The processor 610 may be configured to execute the computer-readable instructions stored by the storage 620. By way of non-limiting example, the processor 610 may be configured to transfer the computer-readable instructions from non-volatile storage of the storage 620 to volatile storage of the storage 620 for execution. Also, in some embodiments, the processor 610 and at least a portion of the storage 620 may be integrated together into a single package (e.g., a microcontroller including internal storage, etc.). In some embodiments, the processor 610 and the storage 620 may be implemented in separate packages.

In some embodiments, the control circuitry 116A may also include at least one hardware element 630 (hereinafter referred to simply as "hardware element" 630). The hardware element 630 may be configured to perform at least a portion of the functions the control circuitry 116A is configured to perform. By way of non-limiting example, the hardware element 630 may be configured to perform at least a portion of the functions of at least one of the signal generator 114, the signal processor 118, and the controller 112 (e.g., at least a portion of the functions discussed with reference to the method 200 of FIG. 2) of FIGS. 1A and 1B. In some embodiments, the hardware element 630 may include a System on Chip (SOC), an array of logic circuits configured to be programmably interfaced to perform functions of the control circuitry 116A (e.g., a Field Programmable Gate Array (FPGA)), an Application Specific Integrated Circuit (ASIC), other hardware elements, and combinations thereof.

Various aspects and embodiments are set forth in the following numbered clauses:

1. An empirically modulated antenna system, comprising:
an antenna comprising:
    a body configured to propagate a reference wave; and
    a plurality of discrete scattering elements spaced at sub-wavelength dimensions of a functional wavelength of the antenna and arranged in a substantially one-dimensional arrangement, the plurality of discrete scattering elements supported by the body, each of the discrete scattering elements of the plurality configured to function:
        individually in a plurality of different operational states; and
        collectively in a plurality of different modulation patterns comprising different permutations of the discrete scattering elements operating in the plurality of different operational states; and
control circuitry comprising a controller configured to control the discrete scattering elements to function in the plurality of different operational states, the controller programmed to:
    modulate the scattering elements to operate in a plurality of one-dimensional modulation patterns;
    monitor a performance parameter of the antenna responsive to the plurality of one-dimensional modulation patterns; and
    set the plurality of discrete scattering elements to operate in one of the plurality of one-dimensional modulation patterns selected based, at least in part, on the performance parameter.

2. The empirically modulated antenna system of clause 1, wherein the controller is further programmed to:
initially set the plurality of discrete scattering elements to operate in an initial modulation pattern;
assign an order to at least a portion of the plurality of discrete scattering elements from a first scattering element to a last scattering element; and
perform, for each discrete scattering element of the portion starting with the first discrete scattering element and progressing in the assigned order through the portion, operational acts comprising:
    evaluating the performance parameter responsive to a current scattering element operating in a current one of the plurality of different operational states;
    modulating the current scattering element to operate in at least one of the others of the plurality of different operational states;
    evaluating the performance parameter responsive to each of the at least one of the others of the plurality of different operational states; and
    setting the current scattering element to operate in an operational state of the plurality of different operational states that corresponds to a best resulting performance parameter.

3. The empirically modulated antenna system of clause 2, wherein the antenna comprises a communication antenna configured to communicate wireless data to a far-end antenna.

4. The empirically modulated antenna system of clause 2, wherein the antenna comprises a power transmission antenna configured to transmit wireless power to a wirelessly powered device.

5. The empirically modulated antenna system of clause 2, wherein the initial modulation pattern comprises the plurality of discrete scattering elements operating in a naïve holographic modulation pattern.

6. The empirically modulated antenna system of clause 2, wherein the initial modulation pattern comprises each of the discrete scattering elements of the plurality of discrete scattering elements operating in a same one of the plurality of different operational states.

7. The empirically modulated antenna system of clause 2, wherein the initial modulation pattern comprises the plurality of discrete scattering elements operating in a previously-used modulation pattern.

8. The empirically modulated antenna system of clause 2, wherein the initial modulation pattern comprises the plurality of discrete scattering elements operating in a user-selected previously-used modulation pattern.

9. The empirically modulated antenna system of clause 2, wherein the control circuitry further comprises a Global Positioning System (GPS), the controller is programmed to store previously-used modulation patterns associated with location data from the GPS, and the controller is programmed to set the plurality of discrete scattering elements to operate in one of the previously-used modulation patterns that is associated with GPS data that matches a current location of the antenna.

10. The empirically modulated antenna system of clause 2, wherein the controller is programmed to assign a discrete scattering element of the portion that is located closest to one or more feed-points of the antenna to be the first scattering element.

11. The empirically modulated antenna system of clause 2, wherein the antenna comprises a single feed-point, and the controller is programmed to assign the order proportionally to proximity of the discrete scattering elements of the portion to the single feed-point of the antenna.

12. The empirically modulated antenna system of clause 2, wherein the antenna comprises a plurality of feed-points, and the controller is programmed to assign discrete scattering elements of the portion that are located closest to one of the plurality of feed-points of the antenna to be earliest in the assigned order.

13. The empirically modulated antenna system of clause 2, wherein the controller is programmed to assign the order at least substantially randomly.

14. The empirically modulated antenna system of clause 2, wherein the performance parameter comprises a gain value of a transmit-receive link between the antenna and a receiving antenna.

15. The empirically modulated antenna system of clause 2, wherein the performance parameter comprises a Received Signal Strength Indicator (RSSI) indicating a received signal strength of a transmitted signal transmitted by the antenna and received at a receiving antenna receiving the transmitted signal.

16. The empirically modulated antenna system of clause 15, wherein the transmitted signal comprises a training signal.

17. The empirically modulated antenna system of clause 16, wherein the training signal comprises a simple sinusoidal tone.

18. The empirically modulated antenna system of clause 16, wherein the training signal comprises a modulated signal that is similar to a data signal that would be transmitted from the antenna to the far-end antenna.

19. The empirically modulated antenna system of clause 18, wherein the training signal comprises a pseudo-random sequence.

20. The empirically modulated antenna system of clause 15, wherein the transmitted signal comprises a communication signal comprising communication data transmitted by the antenna to the far-end antenna.

21. The empirically modulated antenna system of clause 2, wherein the performance parameter comprises a received signal strength parameter of a signal received by the antenna from a transmitting antenna.

22. The empirically modulated antenna system of clause 2, wherein the controller is programmed to modulate the current scattering element to operate in each of the others of the plurality of different operational states.

23. The empirically modulated antenna system of clause 2, wherein the controller is programmed to modulate the current scattering element to operate in less than all of the others of the plurality of different operational states.

24. The empirically modulated antenna system of clause 2, wherein the controller is programmed to repeatedly progress through the scattering elements of the portion.

25. The empirically modulated antenna system of clause 24, wherein the controller is programmed to stop progressing through the scattering elements of the portion after progressing through each of the scattering elements of the portion a predetermined number of times.

26. The empirically modulated antenna system of clause 2, wherein the controller is programmed to stop progressing through the portion of the plurality of discrete scattering elements when the performance parameter improves beyond a predetermined threshold.

27. The empirically modulated antenna system of clause 2, wherein the plurality of different operational states comprises only two operational states comprising a first operational state and a second operational state.

28. The empirically modulated antenna system of clause 1, further comprising at least one other plurality of discrete scattering elements arranged in a substantially one-dimensional arrangement and supported by the body, each other discrete scattering element of the at least one other plurality of discrete scattering elements configured to function:
   individually in the plurality of different operational states; and
   collectively in the plurality of different modulation patterns comprising different permutations of the discrete scattering elements and the other discrete scattering elements operating in the plurality of different operational states;
   wherein the controller is configured to control each of the other plurality of discrete scattering elements to function in the plurality of different operational states.

29. The empirically modulated antenna system of clause 28, wherein the controller is further programmed to:
initially set the plurality of discrete scattering elements and the at least one other plurality of discrete scattering elements to operate in an initial modulation pattern;
assign an order to scattering elements of at least a portion of the plurality of discrete scattering elements and the at least one other plurality of discrete scattering elements from a first scattering element to a last scattering element; and
perform, for each scattering element of the portion, starting with the first scattering element and progressing in the assigned order through the portion, operational acts comprising:
   evaluating the performance parameter responsive to a current scattering element operating in a current one of the plurality of different operational states;
   modulating the current scattering element to operate in at least one of the others of the plurality of different operational states;
   evaluating the performance parameter responsive to each of the at least one of the others of the plurality of different operational states; and
   setting the current scattering element to operate in an operational state of the plurality of different operational states that corresponds to a best resulting performance parameter.

30. The empirically modulated antenna system of clause 29, wherein the controller is programmed to assign the order according to proximity of each of the discrete scattering elements of the portion to one or more feed-points of the antenna regardless of which of the plurality of discrete scattering elements and the other plurality of discrete scattering elements each of the discrete scattering elements belongs to.

31. The empirically modulated antenna system of clause 29, wherein the controller is programmed to assign each of the discrete scattering elements of the other plurality of discrete scattering elements to be earlier in the assigned order if, on average, the other plurality of discrete scattering elements is located closer to one or more feed-points of the antenna than the plurality of discrete scattering elements.

32. The empirically modulated antenna system of clause 31, wherein the controller is programmed to assign those of the discrete scattering elements of the other plurality of discrete scattering elements that are located closest to one of the one or more feed-points to be earlier in the assigned order than those of the other plurality of discrete scattering elements that are located farthest from one of the one or more feed-points.

33. The empirically modulated antenna system of clause 29, wherein the controller is programmed to assign the order at least substantially randomly.

34. The empirically modulated antenna system of clause 1, wherein the controller is further programmed to evaluate the performance parameter for each possible permutation of the discrete scattering elements operating in the plurality of different operational states, and set the plurality of discrete scattering elements to operate in a resulting empirical modulation pattern that corresponds to a best observed performance parameter.

35. The empirically modulated antenna system of clause 1, wherein the controller is further programmed to evaluate the performance parameter for each of a subset of possible permutations of the discrete scattering elements operating in the plurality of different operational states, and set the plurality of discrete scattering elements to operate in a resulting empirical modulation pattern that corresponds to a best observed performance parameter.

36. The empirically modulated antenna system of clause 1, wherein the scattering elements in the plurality of discrete scattering elements are spaced apart at less than a quarter of a free-space wavelength at an operating frequency of the antenna.

37. The empirically modulated antenna system of clause 1, wherein the scattering elements of the plurality of discrete scattering elements are spaced apart at less than a fifth of a free-space wavelength at an operating frequency of the antenna.

38. The empirically modulated antenna system of clause 1, wherein the performance parameter is computed using a cost function.

39. A method for empirically modulating an antenna, the method comprising:
modulating operational states of at least a portion of a plurality of discrete scattering elements of an antenna in a plurality of different empirical one-dimensional modulation patterns, the plurality of different empirical one-dimensional modulation patterns comprising different permutations of the discrete scattering elements operating in different operational states, the plurality of discrete scattering elements arranged in substantially a one-dimensional arrangement;
evaluating a performance parameter of the antenna responsive to the plurality of different empirical one-dimensional modulation patterns; and
operating the antenna in one of the plurality of different one-dimensional empirical modulation patterns selected based, at least in part, on the performance parameter.

40. The method of clause 39, further comprising:
setting the plurality of discrete scattering elements to operate in an initial modulation pattern;
assigning an order to the scattering elements of the portion from a first scattering element to a last scattering element; and
performing, for each of the scattering elements of the portion starting with the first scattering element and progressing in the assigned order through the portion, operational acts comprising:
evaluating the performance parameter responsive to a current scattering element operating in a current one of the different operational states;
modulating the current scattering element to operate in at least one other of the different operational states;
evaluating the performance parameter responsive to each of the at least one other of the different operational states; and
operating the current scattering element in an operational state of the different operational states that results in a best performance parameter.

41. The method of clause 40, further comprising communicating data wirelessly to a far-end antenna through the antenna.

42. The method of clause 40, further comprising transmitting power wirelessly to a wirelessly-powered device through the antenna.

43. The method of clause 40, wherein setting the plurality of discrete scattering elements to operate in an initial modulation pattern comprises setting the plurality of discrete scattering elements to operate in a naïve holographic modulation pattern.

44. The method of clause 40, wherein setting the plurality of discrete scattering elements to operate in an initial modulation pattern comprises setting each of the discrete scattering elements of the plurality of discrete scattering elements to operate in a same one of the at least three different operational states.

45. The method of clause 40, wherein setting the plurality of discrete scattering elements to operate in an initial modulation pattern comprises setting the plurality of discrete scattering elements to operate in a previously-used modulation pattern.

46. The method of clause 40, wherein setting the plurality of discrete scattering elements to operate in an initial modulation pattern comprises setting the plurality of discrete scattering elements to operate in a user-selected previously-used modulation pattern.

47. The method of clause 40, further comprising storing, in a data storage device, data corresponding to previously-used modulation patterns and associated location data from a Global Positioning System (GPS), and setting the plurality of discrete scattering elements to operate in one of the previously-used modulation patterns that is associated with location data that matches a current location of the antenna.

48. The method of clause 40, wherein assigning an order to the discrete scattering elements of the portion comprises assigning a discrete scattering element of the portion that is located closest to one or more feed-points of the antenna to be the first scattering element.

49. The method of clause 40, wherein assigning an order to the discrete scattering elements of the portion comprises assigning the order based, at least in part, on proximity of the discrete scattering elements of the portion to a single feed-point of the antenna.

50. The method of clause 40, wherein assigning an order to the discrete scattering elements of the portion comprises assigning discrete scattering elements of the portion that are located closest to one of a plurality of feed-points of the antenna to be earliest in the assigned order.

51. The method of clause 40, wherein assigning an order to the discrete scattering elements of the portion comprises assigning the order at least substantially randomly.

52. The method of clause 40, wherein evaluating a performance parameter comprises evaluating a gain value of a transmit-receive link between the antenna and a receiving antenna.

53. The method of clause 40, wherein evaluating a performance parameter comprises:
transmitting a transmitted signal with the antenna to a far-end antenna; and
evaluating a Received Signal Strength Indicator (RSSI) indicating a received signal strength of the transmitted signal received at the far-end antenna.

54. The method of clause 53, wherein transmitting a transmitted signal comprises transmitting a training signal.

55. The method of clause 54, wherein transmitting a training signal comprises transmitting a simple sinusoidal tone.

56. The method of clause 54, wherein transmitting a training signal comprises transmitting a modulated signal that is similar to a data signal that would be transmitted from the antenna to the far-end antenna.

57. The method of clause 56, wherein transmitting a modulated signal that is similar to a data signal that would be transmitted from the antenna to the far-end antenna comprises transmitting a pseudo-random sequence.

58. The method of clause 53, wherein transmitting a transmitted signal comprises transmitting a communication signal comprising communication data transmitted by the antenna to the far-end antenna.

59. The method of clause 40, wherein evaluating a performance parameter comprises evaluating a received signal strength parameter of a signal received by the antenna from a far-end antenna.

60. The method of clause 40, wherein modulating the current scattering element to operate in at least one of the others of the different operational states comprises modulating the current scattering element to operate in each of the others of the different operational states.

61. The method of clause 40, wherein modulating the current scattering element to operate in at least one of the others of the different operational states comprises modulating the current scattering element to operate in less than all of the others of the different operational states.

62. The method of clause 40, wherein performing the operational acts comprises performing the operational acts repeatedly by repeatedly progressing through the scattering elements of the portion.

63. The method of clause 62, further comprising terminating progression through the scattering elements of the portion after progressing through each of the scattering elements of the portion a predetermined number of times.

64. The method of clause 40, further comprising terminating progression through the scattering elements of the portion responsive to determining that the performance parameter improved beyond a predetermined threshold.

65. The method of clause 40, wherein modulating operational states of at least a portion of a plurality of discrete scattering elements comprises modulating between only two operational states of the portion of the plurality of discrete scattering elements.

66. The method of clause 39, wherein modulating operational states of at least a portion of scattering elements of a plurality of discrete scattering elements further comprises modulating operational states of at least a portion of at least one other plurality of discrete scattering elements arranged in a substantially one-dimensional arrangement to obtain the plurality of different empirical modulation patterns.

67. The method of clause 66, further comprising:
setting the plurality of discrete scattering and the at least one other plurality of discrete scattering elements to operate in an initial modulation pattern;
assigning an order to the discrete scattering elements of the portion from a first scattering element to a last scattering element; and
performing, for each of the discrete scattering elements of the portion starting with the first scattering element and progressing in the assigned order through the portion, operational acts comprising:
  evaluating the performance parameter responsive to a current scattering element operating in a current one of the different operational states;
  modulating the current scattering element to operate in at least one of the others of the different operational states;
  evaluating the performance parameter responsive to each of the at least one of the others of the different operational states; and
  operating the current scattering element in an operational state of the different operational states that corresponds to a best resulting performance parameter.

68. The method of clause 67, wherein assigning an order to the discrete scattering elements of the portion comprises assigning a discrete scattering element that is located closest to one of one or more feed-points of the antenna to be the first scattering element.

69. The method of clause 67, wherein assigning an order to the discrete scattering elements of the portion comprises assigning each of the discrete scattering elements of the other plurality of discrete scattering elements to be earlier in the assigned order if, on average, the other plurality of discrete scattering elements is located closer to one or more feed-points of the antenna than the plurality of discrete scattering elements.

70. The method of clause 69, further comprising assigning those of the other plurality of discrete scattering elements that are located closer to the one or more feed-points of the antenna be earlier in the assigned order than those of the other plurality of discrete scattering elements that are located farther from one of the one or more feed-points.

71. The method of clause 67, wherein assigning an order to the discrete scattering elements of the portion comprises assigning the order at least substantially randomly.

72. The method of clause 39, wherein:
evaluating a performance parameter of the antenna responsive to the plurality of different empirical modulation patterns comprises evaluating the performance parameter responsive to each possible permutation of the plurality of discrete scattering elements operating in the plurality of different operational states; and
operating the antenna in one of the plurality of different empirical modulation patterns comprises operating the plurality of discrete scattering elements in a resulting empirical modulation pattern that corresponds to a best resulting performance parameter.

73. The method of clause 39, wherein:
evaluating a performance parameter of the antenna responsive to the plurality of different empirical modulation patterns comprises evaluating the performance parameter responsive to each of only a subset of possible permutations of the discrete scattering elements operating in the plurality of different operational states; and
operating the antenna in one of the plurality of different empirical modulation patterns comprises operating the plurality of discrete scattering elements in a resulting empirical modulation pattern that corresponds to a best resulting performance parameter.

74. The method of clause 39, further comprising computing the performance parameter using a cost function.

75. An empirically modulated antenna system, comprising:
an antenna, comprising:
  a body configured to propagate a reference wave; and
  a plurality of discrete scattering elements spaced at sub-wavelength dimensions of a functional wavelength of the antenna and arranged in a substantially two-dimensional arrangement, the plurality of discrete scattering elements supported by the body;
control circuitry comprising a controller configured to control the discrete scattering elements to function in a plurality of different operational states, the controller programmed to:
  modulate the scattering elements to operate in a plurality of two-dimensional modulation patterns comprising different permutations of the discrete scattering elements operating in the plurality of different operational states;
  monitor a performance parameter of the antenna responsive to the plurality of two-dimensional modulation patterns; and
  set the group of discrete scattering elements to operate in one of the plurality of two-dimensional modulation patterns selected based, at least in part, on the monitored performance parameter.

76. The empirically modulated antenna system of clause 75, wherein the plurality of discrete scattering elements is arranged in a plurality of rows.

77. The empirically modulated antenna system of clause 76, wherein the plurality of discrete scattering elements is arranged in a plurality of rows in a first direction and a plurality of rows in a second direction, the second direction substantially perpendicular to the first direction.

78. The empirically modulated antenna system of clause 76, wherein the controller is further programmed to:
initially set the plurality of discrete scattering elements to operate in an initial modulation pattern;
assign an order to each of the scattering elements of at least a portion of the plurality of discrete scattering elements row-by-row starting with a first row and ending with a last row; and
perform, for each scattering element of the portion starting with a first scattering element and progressing in the assigned order through the portion, operational acts comprising:
evaluating the performance parameter responsive to a current scattering element operating in a current one of the plurality of different operational states; modulating the current scattering element to operate in at least one of the others of the plurality of different operational states;
evaluating the performance parameter responsive to each of the at least one of the others of the plurality of different operational states; and
setting the current scattering element to operate in an operational state of the plurality of different operational states that corresponds to a best resulting performance parameter.

79. The empirically modulated antenna system of clause 78, wherein the antenna comprises a communication antenna configured to communicate wireless data to a far-end antenna.

80. The empirically modulated antenna system of clause 78, wherein the antenna comprises a power transmission antenna configured to transmit wireless power to a wirelessly powered device.

81. The empirically modulated antenna system of clause 78, wherein the initial modulation pattern comprises the plurality of discrete scattering elements operating in a naïve holographic modulation pattern.

82. The empirically modulated antenna system of clause 78, wherein the initial modulation pattern comprises each of the discrete scattering elements of the plurality of discrete scattering elements operating in a same one of the plurality of different operational states.

83. The empirically modulated antenna system of clause 78, wherein the initial modulation pattern comprises the plurality of discrete scattering elements operating in a previously-used modulation pattern.

84. The empirically modulated antenna system of clause 78, wherein the initial modulation pattern comprises the plurality of discrete scattering elements operating in a user-selected previously-used modulation pattern.

85. The empirically modulated antenna system of clause 78, wherein the control circuitry further comprises a Global Positioning System (GPS), the controller is programmed to store previously-used modulation patterns associated with location data from the GPS, and the controller is programmed to set the plurality of discrete scattering elements to operate in one of the previously-used modulation patterns that is associated with GPS data that matches a current location of the antenna.

86. The empirically modulated antenna system of clause 78, wherein the first row comprises a row that is closest to one or more feedpoints of the antenna.

87. The empirically modulated antenna system of clause 78, wherein the first through the last row comprise a closest row to one or more feedpoints of the antenna through a farthest row from the one or more feedpoints, respectively.

88. The empirically modulated antenna system of clause 78, wherein the controller is programmed to randomly assign the plurality of rows to be the first row through the last row.

89. The empirically modulated antenna system of clause 78, wherein the controller is programmed to order the discrete scattering elements within each of the plurality of rows from a first discrete scattering element that is closest to one or more feedpoints of the antenna to a last discrete scattering element that is farthest from the one or more feedpoints.

90. The empirically modulated antenna system of clause 78, wherein the controller is programmed to randomly order the discrete scattering elements within each of the plurality of rows.

91. The empirically modulated antenna system of clause 78, wherein the controller is further programmed to:
assign another order to each of the scattering elements of at least the portion of the plurality of discrete scattering elements; and
perform the operational acts for at least a subset of the scattering elements of the portion in the other order after performing the operational acts for each of the scattering elements of the portion in the order.

92. The empirically modulated antenna system of clause 78, wherein the performance parameter comprises a gain value of a transmit-receive link between the antenna and a receiving antenna.

93. The empirically modulated antenna system of clause 78, wherein the performance parameter comprises a Received Signal Strength Indicator (RSSI) indicating a received signal strength of a transmitted signal transmitted by the antenna and received at a receiving antenna receiving the transmitted signal.

94. The empirically modulated antenna system of clause 93, wherein the transmitted signal comprises a training signal.

95. The empirically modulated antenna system of clause 94, wherein the training signal comprises a simple sinusoidal tone.

96. The empirically modulated antenna system of clause 94, wherein the training signal comprises a modulated signal that is similar to a data signal that would be transmitted from the antenna to the far-end antenna.

97. The empirically modulated antenna system of clause 96, wherein the training signal comprises a pseudo-random sequence.

98. The empirically modulated antenna system of clause 93, wherein the transmitted signal comprises a communication signal comprising communication data transmitted by the antenna to the far-end antenna.

99. The empirically modulated antenna system of clause 78, wherein the performance parameter comprises a received signal strength parameter of a signal received by the antenna from a transmitting antenna.

100. The empirically modulated antenna system of clause 78, wherein the plurality of different operational states comprises only two operational states.

101. The empirically modulated antenna system of clause 78, wherein the plurality of different operational states comprises three or more operational states.

102. The empirically modulated antenna system of clause 101, wherein the controller is programmed to modulate the current scattering element to operate in each of the others of the plurality of different operational states.

103. The empirically modulated antenna system of clause 101, wherein the controller is programmed to modulate the current scattering element to operate in less than all of the others of the plurality of different operational states.

104. The empirically modulated antenna system of clause 78, wherein the controller is programmed to repeatedly progress through the scattering elements of the portion.

105. The empirically modulated antenna system of clause 104, wherein the controller is programmed to stop progressing through the scattering elements of the portion after progressing through each of the scattering elements of the portion a predetermined number of times.

106. The empirically modulated antenna system of clause 78, wherein the controller is programmed to stop progressing through the portion of the plurality of discrete scattering elements when the performance parameter improves beyond a predetermined threshold.

107. The empirically modulated antenna system of clause 76, wherein the controller is further programmed to:
initially operate the plurality of discrete scattering elements in an initial modulation pattern;
assign an order to each scattering element of at least a portion of the plurality of discrete scattering elements starting with a first scattering element and ending with a last scattering element, regardless of which of the rows each scattering element of the portion belongs to; and
perform, for each scattering element of the portion, starting with the first scattering element and progressing in the assigned order through the portion, operational acts comprising:
  evaluating the performance parameter responsive to a current scattering element operating in a current one of the plurality of different operational states;
  modulating the current scattering element to operate in at least one of the others of the plurality of different operational states;
  evaluating the performance parameter responsive to each of the at least one of the others of the plurality of different operational states; and
  setting the current scattering element to operate in an operational state of the plurality of different operational states that corresponds to a best resulting performance parameter.

108. The empirically modulated antenna system of clause 107, wherein the antenna comprises a communication antenna configured to communicate wireless data to a far-end antenna.

109. The empirically modulated antenna system of clause 107, wherein the antenna comprises a power transmission antenna configured to transmit wireless power to a wirelessly powered device.

110. The empirically modulated antenna system of clause 107, wherein the initial modulation pattern comprises the plurality of discrete scattering elements operating in a naïve holographic modulation pattern.

111. The empirically modulated antenna system of clause 107, wherein the initial modulation pattern comprises each of the discrete scattering elements of the plurality of discrete scattering elements operating in a same one of the plurality of different operational states.

112. The empirically modulated antenna system of clause 107, wherein the initial modulation pattern comprises the plurality of discrete scattering elements operating in a previously-used modulation pattern.

113. The empirically modulated antenna system of clause 107, wherein the initial modulation pattern comprises the plurality of discrete scattering elements operating in a user-selected previously-used modulation pattern.

114. The empirically modulated antenna system of clause 107, wherein the control circuitry further comprises a Global Positioning System (GPS), the controller is programmed to store previously-used modulation patterns associated with location data from the GPS, and the controller is programmed to set the plurality of discrete scattering elements to operate in one of the previously-used modulation patterns that is associated with GPS data that matches a current location of the antenna.

115. The empirically modulated antenna system of clause 107, wherein the controller is programmed to assign the order according to proximity of each of the scattering elements of the portion to one or more feed-points of the antenna regardless of which of the rows each scattering element of the portion belongs to.

116. The empirically modulated antenna system of clause 107, wherein the controller is further programmed to assign the order across diagonals through the plurality of discrete scattering elements.

117. The empirically modulated antenna system of clause 107, wherein the controller is programmed to assign the order at least substantially randomly.

118. The empirically modulated antenna system of clause 107, wherein the controller is programmed to assign a scattering element of the portion that is located closest to one or more feed-points of the antenna to be the first scattering element.

119. The empirically modulated antenna system of clause 107, wherein the antenna comprises a single feed-point, and the controller is programmed to assign the order proportionally to proximity of the scattering elements of the portion to the single feed-point of the antenna.

120. The empirically modulated antenna system of clause 107, wherein the antenna comprises a plurality of feed-points, and the controller is programmed to assign scattering elements of the portion that are located closest to one of the plurality of feed-points of the antenna to be earliest in the assigned order.

121. The empirically modulated antenna system of clause 107, wherein the controller is further programmed to:
assign another order to each of the scattering elements of the portion of the plurality of discrete scattering elements; and
perform the operational acts for at least a subset of the scattering elements of the portion in the other order after performing the operational acts for each of the scattering elements of the portion in the order.

122. The empirically modulated antenna system of clause 107, wherein the performance parameter comprises a gain value of a transmit-receive link between the antenna and a receiving antenna.

123. The empirically modulated antenna system of clause 107, wherein the performance parameter comprises a Received Signal Strength Indicator (RSSI) indicating a received signal strength of a transmitted signal transmitted by the antenna and received at a receiving antenna receiving the transmitted signal.

124. The empirically modulated antenna system of clause 123, wherein the transmitted signal comprises a training signal.

125. The empirically modulated antenna system of clause 124, wherein the training signal comprises a simple sinusoidal tone.

126. The empirically modulated antenna system of clause 124, wherein the training signal comprises a modulated signal that is similar to a data signal that would be transmitted from the antenna to the far-end antenna.

127. The empirically modulated antenna system of clause 126, wherein the training signal comprises a pseudo-random sequence.

128. The empirically modulated antenna system of clause 123, wherein the transmitted signal comprises a communication signal comprising communication data transmitted by the antenna to the far-end antenna.

129. The empirically modulated antenna system of clause 107, wherein the performance parameter comprises a received signal strength parameter of a signal received by the antenna from a transmitting antenna.

130. The empirically modulated antenna system of clause 10729, wherein the plurality of different operational states comprises only two operational states.

131. The empirically modulated antenna system of clause 107, wherein the plurality of different operational states comprises three or more operational states.

132. The empirically modulated antenna system of clause 131, wherein the controller is programmed to modulate the current scattering element to operate in each of the others of the plurality of different operational states.

133. The empirically modulated antenna system of clause 131, wherein the controller is programmed to modulate the current scattering element to operate in less than all of the others of the plurality of different operational states.

134. The empirically modulated antenna system of clause 107, wherein the controller is programmed to repeatedly progress through the scattering elements of the portion.

135. The empirically modulated antenna system of clause 134, wherein the controller is programmed to stop progressing through the scattering elements of the portion after progressing through each of the scattering elements of the portion a predetermined number of times.

136. The empirically modulated antenna system of clause 107, wherein the controller is programmed to stop progressing through the portion of the plurality of discrete scattering elements when the performance parameter improves beyond a predetermined threshold.

137. The empirically modulated antenna system of clause 75, wherein the controller is further programmed to:
initially operate the plurality of discrete scattering elements in an initial modulation pattern;
assign an order to each scattering element of at least a portion of the plurality of discrete scattering elements; and
perform operational acts for each scattering element of the portion in the assigned order, the operational acts comprising:
  evaluating the performance parameter responsive to a current scattering element operating in a current one of the plurality of different operational states;
  modulating the current scattering element to operate in at least one of the others of the plurality of different scattering elements;
  evaluating the performance parameter responsive to each of the at least one of the others of the plurality of different operational states; and
  setting the current scattering element to operate in an operational state of the plurality of different operational states that corresponds to a best resulting performance parameter.

138. The empirically modulated antenna system of clause 137, wherein the antenna comprises a communication antenna configured to communicate wireless data to a far-end antenna.

139. The empirically modulated antenna system of clause 137, wherein the antenna comprises a power transmission antenna configured to transmit wireless power to a wirelessly powered device.

140. The empirically modulated antenna system of clause 137, wherein the initial modulation pattern comprises the plurality of discrete scattering elements operating in a naïve holographic modulation pattern.

141. The empirically modulated antenna system of clause 137, wherein the initial modulation pattern comprises each of the discrete scattering elements of the plurality of discrete scattering elements operating in a same one of the plurality of different operational states.

142. The empirically modulated antenna system of clause 137, wherein the initial modulation pattern comprises the plurality of discrete scattering elements operating in a previously-used modulation pattern.

143. The empirically modulated antenna system of clause 137, wherein the initial modulation pattern comprises the plurality of discrete scattering elements operating in a user-selected previously-used modulation pattern.

144. The empirically modulated antenna system of clause 137, wherein the control circuitry further comprises a Global Positioning System (GPS), the controller is programmed to store previously-used modulation patterns associated with location data from the GPS, and the controller is programmed to set the plurality of discrete scattering elements to operate in one of the previously-used modulation patterns that is associated with GPS data that matches a current location of the antenna.

145. The empirically modulated antenna system of clause 137, wherein the controller is programmed to assign the order according to proximity of each of the scattering elements of the portion to one or more feed-points of the antenna.

146. The empirically modulated antenna system of clause 137, wherein the controller is programmed to assign the order at least substantially randomly.

147. The empirically modulated antenna system of clause 137, wherein the controller is programmed to assign a scattering element of the portion that is located closest to one or more feed-points of the antenna to be the first scattering element.

148. The empirically modulated antenna system of clause 137, wherein the antenna comprises a single feed-point, and the controller is programmed to assign the order proportionally to proximity of the scattering elements of the portion to the single feed-point of the antenna.

149. The empirically modulated antenna system of clause 137 wherein the antenna comprises a plurality of feed-points, and the controller is programmed to assign scattering elements of the portion that are located closest to one of the plurality of feed-points of the antenna to be earliest in the assigned order.

150. The empirically modulated antenna system of clause 137, wherein the controller is further programmed to:
assign another order to each of the scattering elements of the portion of the plurality of discrete scattering elements; and
perform the operational acts for at least a subset of the scattering elements of the portion in the other order after performing the operational acts for each of the scattering elements of the portion in the order.

151. The empirically modulated antenna system of clause 137, wherein the performance parameter comprises a gain value of a transmit-receive link between the antenna and a receiving antenna.

152. The empirically modulated antenna system of clause 137, wherein the performance parameter comprises a Received Signal Strength Indicator (RSSI) indicating a received signal strength of a transmitted signal transmitted by the antenna and received at a receiving antenna receiving the transmitted signal.

153. The empirically modulated antenna system of clause 152, wherein the transmitted signal comprises a training signal.

154. The empirically modulated antenna system of clause 153, wherein the training signal comprises a simple sinusoidal tone.

155. The empirically modulated antenna system of clause 153, wherein the training signal comprises a modulated signal that is similar to a data signal that would be transmitted from the antenna to the far-end antenna.

156. The empirically modulated antenna system of clause 155, wherein the training signal comprises a pseudo-random sequence.

157. The empirically modulated antenna system of clause 152, wherein the transmitted signal comprises a communication signal comprising communication data transmitted by the antenna to the far-end antenna.

158. The empirically modulated antenna system of clause 137, wherein the performance parameter comprises a received signal strength parameter of a signal received by the antenna from a transmitting antenna.

159. The empirically modulated antenna system of clause 137, wherein the plurality of different operational states comprises only two operational states.

160. The empirically modulated antenna system of clause 137, wherein the plurality of different operational states comprises three or more operational states.

161. The empirically modulated antenna system of clause 160, wherein the controller is programmed to modulate the current scattering element to operate in each of the others of the plurality of different operational states.

162. The empirically modulated antenna system of clause 160, wherein the controller is programmed to modulate the current scattering element to operate in less than all of the others of the plurality of different operational states.

163. The empirically modulated antenna system of clause 137, wherein the controller is programmed to repeatedly progress through the scattering elements of the portion.

164. The empirically modulated antenna system of clause 163, wherein the controller is programmed to stop progressing through the scattering elements of the portion after progressing through each of the scattering elements of the portion a predetermined number of times.

165. The empirically modulated antenna system of clause 163, wherein the controller is programmed to stop progressing through the portion of the plurality of discrete scattering elements when the performance parameter improves beyond a predetermined threshold.

166. The empirically modulated antenna system of clause 75, wherein the controller is further programmed to evaluate the performance parameter for each of a subset of possible permutations of the discrete scattering elements operating in the plurality of different operational states, and set the plurality of discrete scattering elements to operate in a resulting empirical modulation pattern that corresponds to a best observed performance parameter.

167. The empirically modulated antenna system of clause 75, wherein the scattering elements in the plurality of discrete scattering elements are spaced apart at less than a quarter of a free-space wavelength at an operating frequency of the antenna.

168. The empirically modulated antenna system of clause 75, wherein the scattering elements of the plurality of discrete scattering elements are spaced apart at less than a fifth of a free-space wavelength at an operating frequency of the antenna.

169. The empirically modulated antenna system of clause 75, wherein the performance parameter is computed using a cost function.

170. A method for empirically modulating an antenna, the method comprising:
modulating operational states of at least a portion of a plurality of discrete scattering elements of an antenna in a plurality of different empirical two-dimensional modulation patterns, the plurality of different empirical two-dimensional modulation patterns comprising different permutations of the discrete scattering elements operating in different operational states, the plurality of discrete scattering elements arranged in substantially a two-dimensional arrangement;
evaluating a performance parameter of the antenna responsive to the plurality of different empirical two-dimensional modulation patterns; and
operating the antenna in one of the plurality of different two-dimensional empirical modulation patterns selected based, at least in part, on the performance parameter.

171. The method of clause 170, further comprising:
setting the plurality of discrete scattering elements arranged in a plurality of rows to operate in an initial modulation pattern;
assigning an order to the scattering elements of the portion from a first scattering element to a last scattering element row-by-row starting with a first row and ending with a last row; and
performing, for each of the scattering elements of the portion in the assigned order, starting with the first scattering element and progressing in the assigned order through the portion, operational acts comprising:
evaluating the performance parameter responsive to a current scattering element operating in a current one of the different operational states;
modulating the current scattering element to operate in at least one other of the different operational states;
evaluating the performance parameter responsive to each of the at least one other of the different operational states; and
operating the current scattering element in an operational state of the different operational states that results in a best performance parameter.

172. The method of clause 171, further comprising communicating data wirelessly to a far-end antenna through the antenna.

173. The method of clause 171, further comprising transmitting power wirelessly to a wirelessly-powered device through the antenna.

174. The method of clause 171, wherein setting the plurality of discrete scattering elements to operate in an initial modulation pattern comprises setting the plurality of discrete scattering elements to operate in a naïve holographic modulation pattern.

175. The method of clause 171, wherein setting the plurality of discrete scattering elements to operate in an initial modulation pattern comprises setting each of the discrete scattering elements of the plurality of discrete scattering elements to operate in a same one of the plurality of different operational states.

176. The method of clause 171, wherein setting the plurality of discrete scattering elements to operate in an initial modulation pattern comprises setting the plurality of discrete scattering elements to operate in a previously-used modulation pattern.

177. The method of clause 171, wherein setting the plurality of discrete scattering elements to operate in an initial modulation pattern comprises setting the plurality of discrete scattering elements to operate in a user-selected previously-used modulation pattern.

178. The method of clause 171, further comprising storing, in a data storage device, data corresponding to previously-used modulation patterns and associated location data from a Global Positioning System (GPS), and setting the plurality of discrete scattering elements to operate in one of the previously-used modulation patterns that is associated with location data that matches a current location of the antenna.

179. The method of clause 171, wherein assigning an order to the discrete scattering elements of the portion row-by-row comprises starting with a row that is closest to one or more feedpoints of the antenna.

180. The method of clause 171, wherein assigning an order to the discrete scattering elements of the portion row-by-row starting with a first row and ending with a last row comprises assigning the order row-by-row starting with a row that is closest to one or more feedpoints of the antenna and assigning subsequent rows through the last row based on proximity of each of the rows to the one or more feedpoints.

181. The method of clause 171, wherein assigning an order to the discrete scattering elements of the portion row-by-row comprises randomly assigning the plurality of rows to be the first row through the last row.

182. The method of clause 171, wherein assigning an order to the discrete scattering elements of the portion row-by-row comprises ordering the discrete scattering elements within each of the plurality of rows from a first discrete scattering element that is located closest to one or more feedpoints of the antenna to a last discrete scattering element that is farthest from the one or more feedpoints.

183. The method of clause 171, wherein assigning an order to the discrete scattering elements of the portion row-by-row comprises randomly ordering the discrete scattering elements within each of the plurality of rows.

184. The method of clause 171, further comprising:
assigning another order to each of the plurality of scattering elements of at least the portion of the plurality of discrete scattering elements; and
performing the operational acts for at least a subset of the discrete scattering elements of the portion in the other order after performing the operational acts for each of the discrete scattering elements of the portion in the order.

185. The method of clause 171, wherein evaluating a performance parameter comprises evaluating a gain value of a transmit-receive link between the antenna and a receiving antenna.

186. The method of clause 171, wherein evaluating a performance parameter comprises:
transmitting a transmitted signal with the antenna to a far-end antenna; and
evaluating a Received Signal Strength Indicator (RSSI) indicating a received signal strength of the transmitted signal received at the far-end antenna.

187. The method of clause 171, wherein evaluating a performance parameter comprises transmitting a transmitted signal with the antenna to a far-end antenna, wherein transmitting a transmitted signal comprises transmitting a training signal.

188. The method of clause 187, wherein transmitting a training signal comprises transmitting a simple sinusoidal tone.

189. The method of clause 187, wherein transmitting a training signal comprises transmitting a modulated signal that is similar to a data signal that would be transmitted from the antenna to the far-end antenna.

190. The method of clause 189, wherein transmitting a modulated signal that is similar to a data signal that would be transmitted from the antenna to the far-end antenna comprises transmitting a pseudo-random sequence.

191. The method of clause 171, wherein evaluating a performance parameter comprises transmitting a transmitted signal with the antenna to a far-end antenna, wherein transmitting a transmitted signal comprises transmitting a communication signal comprising communication data transmitted by the antenna to the far-end antenna.

192. The method of clause 171, wherein evaluating a performance parameter comprises evaluating a received signal strength parameter of a signal received by the antenna from a far-end antenna.

193. The method of clause 171, wherein modulating the current scattering element to operate in at least one of the others of the different operational states comprises modulating the current scattering element to operate in each of the others of the different operational states.

194. The method of clause 171, wherein modulating the current scattering element to operate in at least one of the others of the different operational states comprises modulating the current scattering element to operate in less than all of the others of the different operational states.

195. The method of clause 171, wherein performing the operational acts comprises performing the operational acts repeatedly by repeatedly progressing through the scattering elements of the portion.

196. The method of clause 195, further comprising terminating progression through the scattering elements of the portion after progressing through each of the scattering elements of the portion a predetermined number of times.

197. The method of clause 195, further comprising terminating progression through the scattering elements of the portion responsive to determining that the performance parameter improved beyond a predetermined threshold.

198. The method of clause 171, wherein modulating operational states of at least a portion of a plurality of discrete scattering elements comprises modulating between only two operational states of the portion of the plurality of discrete scattering elements.

199. The method of clause 171, wherein modulating operational states of at least a portion of a plurality of discrete scattering elements comprises modulating between three or more operational states of the portion of the plurality of discrete scattering elements.

200. The method of clause 170, further comprising:
setting the plurality of discrete scattering elements arranged in a plurality of rows to operate in an initial modulation pattern;
assigning an order to the discrete scattering elements of the portion regardless of which of the plurality of rows the discrete scattering elements belong to; and
performing, for each of the scattering elements of the portion in the assigned order, operational acts comprising:
evaluating the performance parameter responsive to a current scattering element operating in a current one of the plurality of different operational states;

modulating the current scattering element to operate in at least one of the others of the plurality of different operational states;

evaluating the performance parameter responsive to each of the at least one of the others of the plurality of different operational states; and operating the current scattering element in an operational state of the plurality of different operational states that results in a best performance parameter.

201. The method of clause 200, further comprising communicating data wirelessly to a far-end antenna through the antenna.

202. The method of clause 200, further comprising transmitting power wirelessly to a wirelessly-powered device through the antenna.

203. The method of clause 200, wherein setting the plurality of discrete scattering elements to operate in an initial modulation pattern comprises setting the plurality of discrete scattering elements to operate in a naïve holographic modulation pattern.

204. The method of clause 200, wherein setting the plurality of discrete scattering elements to operate in an initial modulation pattern comprises setting each of the discrete scattering elements of the plurality of discrete scattering elements to operate in a same one of the plurality of different operational states.

205. The method of clause 200, wherein setting the plurality of discrete scattering elements to operate in an initial modulation pattern comprises setting the plurality of discrete scattering elements to operate in a previously-used modulation pattern.

206. The method of clause 200, wherein setting the plurality of discrete scattering elements to operate in an initial modulation pattern comprises setting the plurality of discrete scattering elements to operate in a user-selected previously-used modulation pattern.

207. The method of clause 200, further comprising storing, in a data storage device, data corresponding to previously-used modulation patterns and associated location data from a Global Positioning System (GPS), and setting the plurality of discrete scattering elements to operate in one of the previously-used modulation patterns that is associated with location data that matches a current location of the antenna.

208. The method of clause 200, wherein assigning an order to the discrete scattering elements of the portion comprises ordering the discrete scattering elements of the portion diagonally through the two-dimensional arrangement.

209. The method of clause 200, wherein assigning an order to the discrete scattering elements of the portion comprises ordering the discrete scattering elements according to their proximity to one or more feedpoints of the antenna.

210. The method of clause 200, wherein assigning an order to the discrete scattering elements of the portion comprises at least substantially randomly ordering the discrete scattering elements of the portion.

211. The method of clause 200, wherein assigning an order to the discrete scattering elements of the portion comprises assigning a discrete scattering element of the portion that is located closest to one or more feed-points of the antenna to be the first scattering element.

212. The method of clause 200, wherein assigning an order to the discrete scattering elements of the portion further comprises:

assigning another order to each of the discrete scattering elements of the portion of the plurality of discrete scattering elements; and performing the operational acts for at least a subset of the discrete scattering elements of the portion in the other order after performing the operational acts for each of the discrete scattering elements of the portion in the order.

213. The method of clause 200, wherein evaluating a performance parameter comprises evaluating a gain value of a transmit-receive link between the antenna and a receiving antenna.

214. The method of clause 200, wherein evaluating a performance parameter comprises:

transmitting a transmitted signal with the antenna to a far-end antenna; and evaluating a Received Signal Strength Indicator (RSSI) indicating a received signal strength of the transmitted signal received at the far-end antenna.

215. The method of clause 200, wherein evaluating a performance parameter comprises transmitting a transmitted signal comprising a training signal.

216. The method of clause 215, wherein transmitting a transmitted signal comprising a training signal comprises transmitting a simple sinusoidal tone.

217. The method of clause 215, wherein transmitting a transmitted signal comprising a training signal comprises transmitting a modulated signal that is similar to a data signal that would be transmitted from the antenna to the far-end antenna.

218. The method of clause 217, wherein transmitting a modulated signal that is similar to a data signal that would be transmitted from the antenna to the far-end antenna comprises transmitting a pseudo-random sequence.

219. The method of clause 200, wherein evaluating a performance parameter comprises transmitting a transmitted signal comprising transmitting a communication signal including communication data transmitted by the antenna to a far-end antenna.

220. The method of clause 200, wherein evaluating a performance parameter comprises evaluating a received signal strength parameter of a signal received by the antenna from a far-end antenna.

221. The method of clause 200, wherein modulating the current scattering element to operate in at least one of the others of the different operational states comprises modulating the current scattering element to operate in each of the others of the different operational states.

222. The method of clause 200, wherein modulating the current scattering element to operate in at least one of the others of the different operational states comprises modulating the current scattering element to operate in less than all of the others of the different operational states.

223. The method of clause 200, wherein performing the operational acts comprises performing the operational acts repeatedly by repeatedly progressing through the scattering elements of the portion.

224. The method of clause 223, further comprising terminating progression through the scattering elements of the portion after progressing through each of the scattering elements of the portion a predetermined number of times.

225. The method of clause 223, further comprising terminating progression through the scattering elements of the portion responsive to determining that the performance parameter improved beyond a predetermined threshold.

226. The method of clause 200, wherein modulating operational states of at least a portion of a plurality of discrete scattering elements comprises modulating between only two operational states of the portion of the plurality of discrete scattering elements.

227. The method of clause 200, wherein modulating operational states of at least a portion of a plurality of discrete scattering elements comprises modulating between three or more operational states of the portion of the plurality of discrete scattering elements.

228. The method of clause 170, further comprising:
setting the plurality of discrete scattering elements to operate in an initial modulation pattern;
assigning an order to the discrete scattering elements of the portion; and
performing, for each of the discrete scattering elements of the portion in the assigned order, operational acts comprising:
evaluating the performance parameter responsive to a current scattering element operating in a current one of the different operational states;
modulating the current scattering element to operate in at least one of the others of the different operational states;
evaluating the performance parameter responsive to each of the at least one of the others of the different operational states; and
operating the current scattering element in an operational state of the plurality of different operational states that results in a best performance parameter.

229. The method of clause 228, further comprising communicating data wirelessly to a far-end antenna through the antenna.

230. The method of clause 228, further comprising transmitting power wirelessly to a wirelessly-powered device through the antenna.

231. The method of clause 228, wherein setting the plurality of discrete scattering elements to operate in an initial modulation pattern comprises setting the plurality of discrete scattering elements to operate in a naïve holographic modulation pattern.

232. The method of clause 228, wherein setting the plurality of discrete scattering elements to operate in an initial modulation pattern comprises setting each of the discrete scattering elements of the plurality of discrete scattering elements to operate in a same one of the plurality of different operational states.

233. The method of clause 228, wherein setting the plurality of discrete scattering elements to operate in an initial modulation pattern comprises setting the plurality of discrete scattering elements to operate in a previously-used modulation pattern.

234. The method of clause 228, wherein setting the plurality of discrete scattering elements to operate in an initial modulation pattern comprises setting the plurality of discrete scattering elements to operate in a user-selected previously-used modulation pattern.

235. The method of clause 228, further comprising storing, in a data storage device, data corresponding to previously-used modulation patterns and associated location data from a Global Positioning System (GPS), and setting the plurality of discrete scattering elements to operate in one of the previously-used modulation patterns that is associated with location data that matches a current location of the antenna.

236. The method of clause 228, wherein assigning an order to the discrete scattering elements of the portion comprises ordering the discrete scattering elements according to their proximity to one or more feedpoints of the antenna.

237. The method of clause 228, wherein assigning an order to the discrete scattering elements of the portion comprises at least substantially randomly ordering the discrete scattering elements of the portion.

238. The method of clause 228, wherein assigning an order to the discrete scattering elements of the portion comprises assigning a discrete scattering element of the portion that is located closest to one or more feed-points of the antenna to be the first scattering element.

239. The method of clause 228, wherein assigning an order to the discrete scattering elements of the portion further comprises:
assigning another order to each of the discrete scattering elements of the portion of the plurality of discrete scattering elements; and
performing the operational acts for at least a subset of the discrete scattering elements of the portion in the other order after performing the operational acts for each of the discrete scattering elements of the portion in the order.

240. The method of clause 228, wherein evaluating a performance parameter comprises evaluating a gain value of a transmit-receive link between the antenna and a receiving antenna.

241. The method of clause 228, wherein evaluating a performance parameter comprises:
transmitting a transmitted signal with the antenna to a far-end antenna; and
evaluating a Received Signal Strength Indicator (RSSI) indicating a received signal strength of the transmitted signal received at the far-end antenna.

242. The method of clause 228, wherein evaluating a performance parameter comprises transmitting a transmitted signal comprising a training signal.

243. The method of clause 242, wherein transmitting a transmitted signal comprising a training signal comprises transmitting a simple sinusoidal tone.

244. The method of clause 242, wherein transmitting a transmitted signal comprising a training signal comprises transmitting a modulated signal that is similar to a data signal that would be transmitted from the antenna to the far-end antenna.

245. The method of clause 244, wherein transmitting a modulated signal that is similar to a data signal that would be transmitted from the antenna to the far-end antenna comprises transmitting a pseudo-random sequence.

246. The method of clause 228, wherein evaluating a performance parameter comprises transmitting a transmitted signal comprising transmitting a communication signal including communication data transmitted by the antenna to a far-end antenna.

247. The method of clause 228, wherein evaluating a performance parameter comprises evaluating a received signal strength parameter of a signal received by the antenna from a far-end antenna.

248. The method of clause 228, wherein modulating the current scattering element to operate in at least one of the others of the different operational states comprises modulating the current scattering element to operate in each of the others of the different operational states.

249. The method of clause 228, wherein modulating the current scattering element to operate in at least one of the others of the different operational states comprises modulating the current scattering element to operate in less than all of the others of the different operational states.

250. The method of clause 228, wherein performing the operational acts comprises performing the operational acts repeatedly by repeatedly progressing through the scattering elements of the portion.

251. The method of clause 250, further comprising terminating progression through the scattering elements of the portion after progressing through each of the scattering elements of the portion a predetermined number of times.

252. The method of clause 250, further comprising terminating progression through the scattering elements of the portion responsive to determining that the performance parameter improved beyond a predetermined threshold.

253. The method of clause 228, wherein modulating operational states of at least a portion of a plurality of discrete scattering elements comprises modulating between only two operational states of the portion of the plurality of discrete scattering elements.

254. The method of clause 228, wherein modulating operational states of at least a portion of a plurality of discrete scattering elements comprises modulating between three or more operational states of the portion of the plurality of discrete scattering elements.

255. The method of clause 170, wherein:
evaluating a performance parameter of the antenna responsive to the plurality of different empirical modulation patterns comprises evaluating the performance parameter responsive to each possible permutation of the plurality of discrete scattering elements operating in the plurality of different operational states; and
operating the antenna in one of the plurality of different empirical modulation patterns comprises operating the plurality of discrete scattering elements in a resulting empirical modulation pattern that corresponds to a best resulting performance parameter.

256. The method of clause 170, wherein:
evaluating a performance parameter of the antenna responsive to the plurality of different empirical modulation patterns comprises evaluating the performance parameter responsive to each of only a subset of possible permutations of the discrete scattering elements operating in the plurality of different operational states; and
operating the antenna in one of the plurality of different empirical modulation patterns comprises operating the plurality of discrete scattering elements in a resulting empirical modulation pattern that corresponds to a best resulting performance parameter.

183. The method of clause 170, further comprising computing the performance parameter using a cost function.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims. Furthermore, the disclosure contemplates combinations of any of the disclosed embodiments and examples, except as would be incompatible in practice, as would be understood by those skilled in the art.

The invention claimed is:

1. A method comprising:
controlling operation of a plurality of scattering elements in an empirically modulated antenna system to operate at discrete operational configurations and form an initial modulation pattern;
identifying a performance parameter of the empirically modulated antenna system to evaluate after each of the plurality of scattering elements is discretely modulated on a per-element basis; and
discretely modulating a corresponding operational configuration of each of the plurality of scattering elements on the per-element basis from a first scattering element to a last scattering element in an assigned order of scattering elements of the plurality of scattering elements to evaluate the performance parameter on the per-element basis with respect to each of a plurality of different operational configurations.

2. The method of claim 1, wherein the plurality of scattering elements includes a first scattering element and a second scattering element, the method further comprising:
discretely modulating an operational configuration of the first scattering element on the per-element basis while refraining from modulating an operational configuration of the second scattering element to dynamically change a modulation pattern of the empirically modulated antenna system from the initial modulation pattern;
evaluating the performance parameter each time the operational configuration of the first scattering element is modulated; and
controlling further modulation of the operational configuration of the first scattering element based on the evaluated performance parameter.

3. The method of claim 2, wherein discretely modulating the operational configuration of the first scattering element includes modulating the operational configuration of the first scattering element from an initial operational configuration of the first scattering element in forming the initial modulation pattern.

4. The method of claim 2, wherein controlling further modulation of the operational configuration of the first scattering element includes refraining from further modulating the operational configuration of the first scattering element after a first modulation pattern that is different from the initial modulation pattern is achieved at the empirically modulated antenna system.

5. The method of claim 4, further comprising:
discretely modulating an operational configuration of the second scattering element on the per-element basis after the first scattering element is discretely modulated to achieve the first modulation pattern at the empirically modulated antenna system;
evaluating the performance parameter each time the operational configuration of the second scattering element is modulated; and
controlling further modulation of the operational configuration of the second scattering element based on the evaluated performance parameter.

6. The method of claim 5, wherein discretely modulating the operational configuration of the second scattering element includes modulating the operational configuration of the second scattering element from an initial operational configuration of the second scattering element in forming the initial modulation pattern.

7. The method of claim 5, wherein controlling further modulation of the operational configuration of the second scattering element includes refraining from further modulating the operational configuration of the second scattering element after a second modulation pattern that is different from the first modulation pattern is achieved at the empirically modulated antenna system.

8. The method of claim 5, wherein discretely modulating the operational configuration of the second scattering element further includes initially modulating the operational configuration of the second scattering element based on the performance parameter evaluated after a last instance that the operational configuration of the first scattering element is modulated to achieve the first modulation pattern at the empirically modulated antenna system.

9. The method of claim 8, wherein discretely modulating the operational configuration of the second scattering element further includes initially modulating the operational configuration of the second scattering element based on the performance parameter evaluated before the operational configuration of the second scattering element is modulated.

10. The method of claim 2, wherein the assigned order of scattering elements indicates discretely modulating the operational configuration of the first scattering element before discretely modulating the operational configuration of the second scattering element.

11. The method of claim 1, wherein the assigned order of scattering elements is defined based on corresponding locations of each of the plurality of scattering elements with respect to one or more feed-points of the empirically modulated antenna system.

12. The method of claim 1, wherein the plurality of scattering elements form an array of scattering elements and the assigned order of scattering elements is defined based on physical positions of each of the scattering elements within the array of scattering elements.

13. The method of claim 1, wherein the plurality of scattering elements are spaced apart at less than a quarter of a free-space wavelength of an operating frequency of the empirically modulated antenna system.

14. The method of claim 1, wherein the operational configuration of each of the plurality of scattering elements is discretely modulated on the per-element basis in the assigned order of scattering elements by completely progressing through the assigned order of scattering element a plurality of times to modulate each of the scattering elements a plurality of times.

15. The method of claim 1, wherein the performance parameter includes one of a gain value of a transmit-receive link between the empirically modulated antenna system and a far-end antenna and a received signal strength parameter for the empirically modulated antenna system.

16. An empirically modulated antenna system, comprising:
    an antenna comprising a plurality of scattering elements configured to operate at discrete operational configurations to form a modulation pattern for the empirically modulated antenna system; and
    a controller configured to:
        control operation of the plurality of scattering elements to operate at the discrete operational configurations and form an initial modulation pattern;
        identify a performance parameter of the empirically modulated antenna system to evaluate after each of the plurality of scattering elements is discretely modulated on a per-element basis; and
        discretely modulate a corresponding operational configuration of each of the plurality of scattering elements on the per-element basis from a first scattering element to a last scattering element in an assigned order of scattering elements of the plurality of scattering elements to evaluate the performance parameter on the per-element basis with respect to each of a plurality of different operational configurations.

17. The empirically modulated antenna system of claim 16, wherein the plurality of scattering elements includes a first scattering element and a second scattering element and the controller is further configured to:
    discretely modulate an operational configuration of the first scattering element on the per-element basis while refraining from modulating an operational configuration of the second scattering element to dynamically change a modulation pattern of the empirically modulated antenna system from the initial modulation pattern;
    evaluate the performance parameter each time the operational configuration of the first scattering element is modulated; and
    control further modulation of the operational configuration of the first scattering element based on the evaluated performance parameter.

18. The empirically modulated antenna system of claim 17, wherein the controller is further configured to modulate the operational configuration of the first scattering element from an initial operational configuration of the first scattering element in forming the initial modulation pattern, as part of discretely modulating the operational configuration of the first scattering element.

19. The empirically modulated antenna system of claim 17, wherein the controller is further configured to refrain from further modulating the operational configuration of the first scattering element after a first modulation pattern that is different from the initial modulation pattern is achieved at the empirically modulated antenna system, as part of controlling further modulation of the operational configuration of the first scattering element.

20. The empirically modulated antenna system of claim 19, wherein the controller is further configured to:
    discretely modulate an operational configuration of the second scattering element on the per-element basis after the first scattering element is discretely modulated to achieve the first modulation pattern at the empirically modulated antenna system;
    evaluate the performance parameter each time the operational configuration of the second scattering element is modulated; and
    control further modulation of the operational configuration of the second scattering element based on the evaluated performance parameter.

21. The empirically modulated antenna system of claim 20, wherein the controller is further configured to modulate the operational configuration of the second scattering element from an initial operational configuration of the second scattering element in forming the initial modulation pattern, as part of discretely modulating the operational configuration of the second scattering element.

22. The empirically modulated antenna system of claim 20, wherein the controller is further configured to refrain from further modulating the operational configuration of the second scattering element after a second modulation pattern that is different from the first modulation pattern is achieved at the empirically modulated antenna system, as part of controlling further modulation of the operational configuration of the second scattering element.

23. The empirically modulated antenna system of claim 20, wherein the controller is further configured to initially modulate the operational configuration of the second scattering element based on the performance parameter evaluated after a last instance that the operational configuration of the first scattering element is modulated to achieve the first modulation pattern at the empirically modulated antenna system, as part of discretely modulating the operational configuration of the second scattering element further.

24. The empirically modulated antenna system of claim 23, wherein the controller is further configured to initially modulate the operational configuration of the second scattering element based on the performance parameter evaluated before the operational configuration of the second scattering element is modulated, as part of discretely modulating the operational configuration of the second scattering element further.

25. The empirically modulated antenna system of claim 17, wherein the assigned order of scattering elements indicates discretely modulating the operational configuration of the first scattering element before discretely modulating the operational configuration of the second scattering element.

26. The empirically modulated antenna system of claim 16, wherein the assigned order of scattering elements is defined based on corresponding locations of each of the plurality of scattering elements with respect to one or more feed-points of the empirically modulated antenna system.

27. The empirically modulated antenna system of claim 16, wherein the plurality of scattering elements form an array of scattering elements and the assigned order of scattering elements is defined based on physical positions of each of the scattering elements within the array of scattering elements.

28. The empirically modulated antenna system of claim 16, wherein the plurality of scattering elements are spaced apart at less than a quarter of a free-space wavelength of an operating frequency of the empirically modulated antenna system.

29. The empirically modulated antenna system of claim 16, wherein the controller is further configured to discretely modulate the operational configuration of each of the plurality of scattering elements on the per-element basis in the assigned order of scattering elements by completely progressing through the assigned order of scattering element a plurality of times to modulate each of the scattering elements a plurality of times.

30. The empirically modulated antenna system of claim 16, wherein the performance parameter includes one of a gain value of a transmit-receive link between the empirically modulated antenna system and a far-end antenna and a received signal strength parameter for the empirically modulated antenna system.

31. The method of claim 1, wherein discretely modulating comprises:
evaluating the performance parameter responsive to a current scattering element operating in a current discrete operational configuration;
modulating the current scattering element to operate in at least one of the plurality of different operational configurations;
evaluating the performance parameter responsive to each of the at least one of the plurality of different operational configurations; and
setting the current scattering element to operate in an operational configuration that corresponds to a best resulting performance parameter.

32. The method of claim 31, wherein discretely modulating comprises:
evaluating the performance parameter responsive to each possible permutation of the plurality of scattering elements operating in the plurality of different operational configurations.

33. The method of claim 31, wherein discretely modulating comprises:
evaluating the performance parameter responsive to each of only a subset of possible permutations of the plurality of scattering elements operating in the plurality of different operational configurations.

34. The empirically modulated antenna system of claim 16, wherein the controller is configured to discretely modulate a corresponding operational configuration of each of the plurality of scattering elements on the per-element basis by:
evaluating the performance parameter responsive to a current scattering element operating in a current discrete operational configuration;
modulating the current scattering element to operate in at least one of the plurality of different operational configurations;
evaluating the performance parameter responsive to each of the at least one of the plurality of different operational configurations; and
setting the current scattering element to operate in an operational configuration that corresponds to a best resulting performance parameter.

35. The empirically modulated antenna system of claim 34, wherein the controller is further configured to:
evaluate the performance parameter responsive to each possible permutation of the plurality of scattering elements operating in the plurality of different operational configurations.

36. The empirically modulated antenna system of claim 34, wherein the controller is further configured to:
evaluating the performance parameter responsive to each of only a subset of possible permutations of the plurality of scattering elements operating in the plurality of different operational configurations.

* * * * *